United States Patent [19]
Miyazawa et al.

[11] Patent Number: 5,343,108
[45] Date of Patent: Aug. 30, 1994

[54] ULTRASONIC STEP MOTOR

[75] Inventors: Osamu Miyazawa; Tsuneaki Furukawa; Jouji Kitahara, all of Suwa, Japan

[73] Assignee: Seiko Epson Corporation, Tokyo, Japan

[21] Appl. No.: 822,485

[22] Filed: Jan. 17, 1992

[30] Foreign Application Priority Data

| Jan. 17, 1991 | [JP] | Japan | 3-003924 |
| Apr. 3, 1991 | [JP] | Japan | 3-070882 |
| May 7, 1991 | [JP] | Japan | 3-101260 |
| Aug. 28, 1991 | [JP] | Japan | 3-217072 |

[51] Int. Cl.$^5$ .................................. H01L 41/08
[52] U.S. Cl. .................................. 310/323; 310/317
[58] Field of Search .................. 310/316, 317, 323; 318/116

[56] References Cited

U.S. PATENT DOCUMENTS

| 4,484,099 | 11/1984 | Kawai et al. | 310/323 X |
| 4,686,407 | 8/1987 | Ceperley | 310/323 |
| 4,692,649 | 9/1987 | Izukawa et al. | 310/323 X |
| 4,829,209 | 5/1989 | Kawasaki et al. | 310/323 |
| 4,833,359 | 5/1989 | Tanoue et al. | 310/323 X |
| 4,882,500 | 11/1989 | Iijima | 310/323 |
| 5,006,746 | 4/1991 | Kasuga et al. | 310/323 |
| 5,025,186 | 6/1991 | Tsukada | 310/323 |
| 5,073,739 | 12/1991 | Iijima et al. | 310/323 |
| 5,079,470 | 1/1992 | Kasuga et al. | 310/323 |

FOREIGN PATENT DOCUMENTS 90311426.2 4/1991 European Pat. Off.
86793 10/1987 Japan.

Primary Examiner—Mark O. Budd
Attorney, Agent, or Firm—Stroock & Stroock & Lavan

[57] ABSTRACT

An ultrasonic step motor includes a stator and a rotor. A vibrator is mounted on the stator and a driving mechanism excites the vibrator causing the stator to induce a vibrating mode on the rotor. The rotor has a vibration mode in a selected direction and the stator exhibits a plurality of vibrating states which are changed in a time sequential manner. The vibrating states of the stator include a composite vibration of a travelling wave formed from two standing wave vibrations and a standing wave vibration. The rotor is formed of a non-uniform rigidity and mass distribution and the stator is formed with relief portions formed therein corresponding to loops of a standing wave vibration and projections corresponding to the nodes of the standing wave vibration.

9 Claims, 25 Drawing Sheets

FIG. 17a
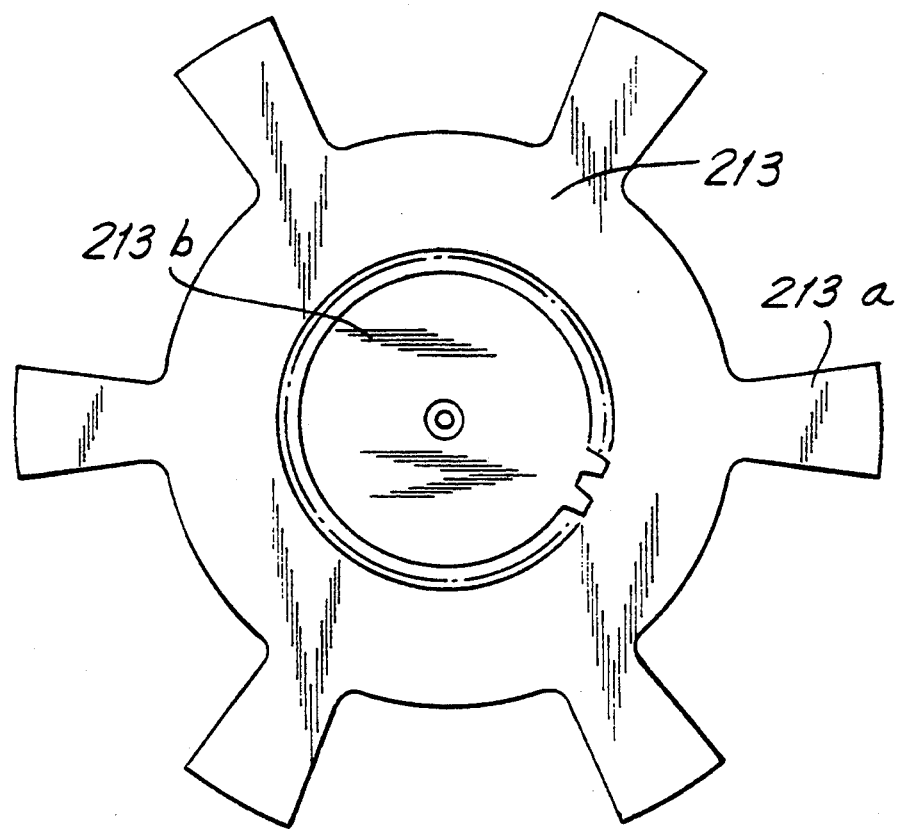
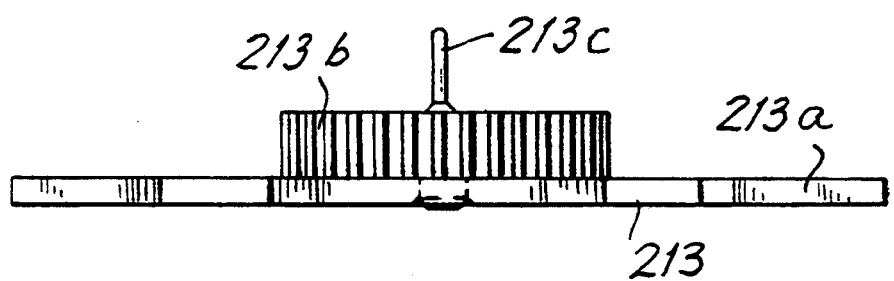
FIG. 17b

ULTRASONIC STEP MOTOR

BACKGROUND OF THE INVENTION

The present invention generally relates to an ultrasonic step motor, and more particularly, to an ultrasonic motor driven by ultrasonic vibration in the form of an ultrasonic wave.

Conventional types of ultrasonic motors using vibration have been proposed as described in Japanese Patent Application Laid-Open (KOKAI) No. 58-93477, Japanese Patent Application Post-Examination Publication No. 59-37673, and Japanese Patent Application Laid-Open (KOKAI) Nos. 59-122385 and 60-51478. The Japanese Patent Laid-Open No. 58-93477 discloses a method for arbitrarily switching the driving direction of a piezoelectric motor as required by applying a voltage output having a prescribed phased difference to a plurality of vibrators. Japanese Patent Laid Open No. 59-122385 discloses a method for converting strong vibration energy of a supersonic wave into rotational or linear movement. Japanese Patent Laid Open No. 60-51478 discloses a motor which displays accurate time by etching a pattern of sixty divisions on an electronic timepiece made of a piezoelectric motor. The pattern detects the rotating state to control the drive of the motor. All of the conventional ultrasonic motors rotate continuously as long as a driving signal is applied thereto.

The prior art ultrasonic motors have been satisfactory. However, prior art motors utilize a rotor which continuously rotates or rotates only when the driving voltage driving wave shapes are input to the motor. Accordingly, feedback control must be effected in order to control the rotational speed and stop position of the conventional ultrasonic motors. Hence the system of the prior art requires a feedback control circuit resulting in the complication of the entire control system of the ultrasonic motor.

Accordingly, it is desirable to provide an ultrasonic motor which overcomes the shortcomings of the prior art.

SUMMARY OF THE INVENTION

Generally speaking, in accordance with the invention, an ultrasonic step motor includes a stator. The stator exhibits a vibratory wave and switches between a plurality of vibratory states in a time series manner. A rotor contacts the stator and is driven by frictional force between the rotor and the stator. The rotor is induced to vibrate by the stator and exhibits a vibration mode in a selected direction. The rotor has a non-uniform distribution of either mass and/or rigidity.

In one embodiment of the ultrasonic step motor the vibration states of the stator include at least a composite of an advancing wave vibration state (hereinafter referred to as a "travelling wave") formed from two standing wave vibrations and a standing wave vibration state where a vibration mode is formed in a selected direction. The stator is provided with relief portions at respective positions corresponding to the loops or antinodes of a standing wave vibration, the stator contacting the rotor at positions corresponding to the nodes of the vibration wave.

In another embodiment of the invention, a vibrator having a plurality of vibrator elements is disposed on the stator. The vibrator elements displace a respective portion of the stator in response to a voltage provided by a driving circuit. A first set of vibrator elements form a first driving phase and a second set of vibrator elements form a second driving phase. The vibrator elements of the first driving phase are disposed in axial symmetry with the vibrator element of the second driving phase with respect to the axis of the vibrator.

A first set of electrodes is affixed to the first set of vibrator elements, a second set of electrodes is affixed to the second set of vibrator elements and a common electrode is mounted on the stator. The driving circuit includes a switching circuit for selectively coupling the first set of electrodes and the second set of electrodes to the common electrode respectively so that the driving means selectively inputs a first voltage to the first set of electrodes and the second set of electrodes to produce a standing wave vibration mode on the stator, sequentially moves a nodal position of the node about the stator, and applies a second voltage to the common electrode, the voltage applied to the common electrode being in phase opposition to the first voltage applied to either one of the first set of electrodes and second set of electrodes.

In another embodiment of the invention, the driving means outputs a voltage to at least one of the vibrator elements for a predetermined time period. The switching circuit couples the vibrators which do not receive a voltage to the common electrode during the predetermined time period.

Accordingly, it is an object of the invention to provide an improved ultrasonic motor.

Another object of the present invention to provide an ultrasonic motor which can be driven in a stepwisely manner and hence facilitates sequence control.

Yet another object of the invention is to provide an ultrasonic motor which allows both a continuous drive, a travelling wave, or a stepwise drive on a standing wave, to drive the motor.

Another object of the present invention is to provide an ultrasonic motor having a stator and a rotor which utilizes the frictional force caused therebetween in a non-driving mode.

Still another object of the present invention is to provide an ultrasonic step motor which specifies the direction of a vibration mode by providing a rotor with non-unitary mass and rigidity distribution patterns to induce non-resonant vibration waves.

Yet a further object of the invention is provide a stator having vibrating sections which are polarized and either are larger or smaller than one half of the wavelength of the vibrating wave and are disposed with equal area at two extremities of each phase to form each phase in a well balanced condition so that the node of the vibrating wave is formed at the boundary between the vibrating sections.

Another object of the invention is to drive the stator so that the standing wave is driven so that each phase is coincident with the boundary between the vibrating sections and the amplitude of the standing waves produced by utilizing two phases are equal to each other so that the node positions of a composite wave of the standing waves are formed at expected positions.

Still another object of the present invention is to provide a driving method for a vibrator in an ultrasonic step motor which eliminates distortion in vibration wave patterns by connecting the electrodes of vibrator elements to which no voltage is applied to a common electrode so that the node positions of the vibration mode can be formed at the desired positions thus improving the positioning accuracy in the stepwise driving of the motor.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description, taken in connection with the accompanying drawings, in which:

FIG. 17a is a top plan view of a rotor constructed in accordance with another embodiment of the invention;

FIG. 17b is a side elevational view of the rotor of FIG. 17a;

DETAILED DESCRIPTION OF THE PREFERRED EMBODIMENTS

Figure 1:
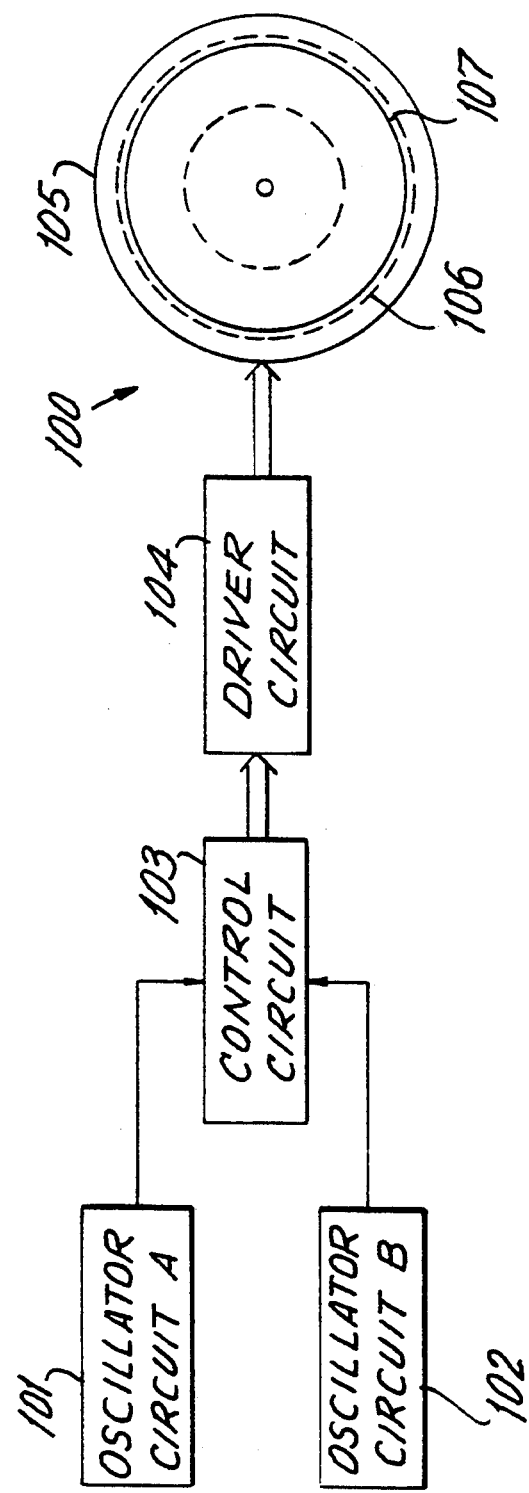
FIG. 1 is a block diagram of a driving circuit for an ultrasonic step motor constructed in accordance with the present invention.

Reference is first made to FIG. 1 in which a block diagram of an ultrasonic step motor, generally indicated as 100, and a drive system for driving motor 100, constructed in accordance with the present invention is provided. Ultrasonic step motor 100 includes a stator 105, and a rotor 107. A vibrator 106 is mounted on stator 105. Stator 105 is formed as an elastic member, and rotor 107 rotates relative to stator 105.

A pair of oscillator circuits A 101, B 102 each outputs a signal having a frequency which is substantially equal to the resonance frequency of stator 105. A control circuit 103 receives the signals from oscillator circuits A 101 and B 102 and inputs them to vibrator 106 through a driver circuit 104. Control circuit 103 outputs either the output of oscillator A 101 or oscillator B 102 and selectively switches between these two outputs.

Vibrator 106 vibrates stator 105 in wave patterns in response to the output of driver circuit 104. Rotor 107 is in frictional contact with stator 105 and is driven by the vibration of stator 105. The modes of vibrations that are induced on stator 105 by the oscillator circuits A 101 and B 102 are equal in shape but offset in position from each other. Accordingly, if two standing wave vibrations are generated at positions which are offset, by a quarter-wavelength for example, an elliptical motion in the form of a travelling wave is induced on the surface of stator 105, thus enabling the rotor 107 to be driven, as is well known in the conventional travelling wave type ultrasonic motors.

In this case, since the driving signals output in response to the signals generated by oscillator circuits A 101, B 102 are equal in frequency but different in phase from each other, there is no need for two oscillator circuits. The same result may be obtained with one oscillator circuit and a phase shifting circuit. It should be noted that, if either one of the oscillator circuits A 101 and B 102 is driven singly or both are simultaneously driven in phase with each other, one standing wave vibration mode is formed. When a travelling wave is produced, rotor 107 moves continuously, whereas, when a standing wave is produced rotor 107 is maintained in a predetermined position. When no wave is produced, rotor 107 is held in place by friction occurring between rotor 107 and stator 105.

The principle on which the rotor 107 is set in a predetermined position will be explained below. With the above-described arrangement, if driver circuit 104 sequentially switches between travelling and standing waves, rotor 107 is intermittently driven in a stepwise manner. If an interval of time during which no wave is produced is provided and friction maintains rotor 107 in position, electric power can be saved.

Figure 2A:
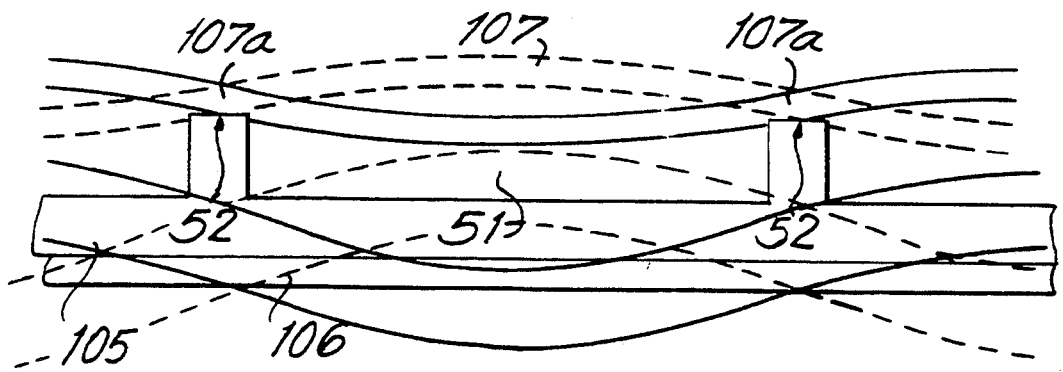
FIGS. 2a, 2b and 2c are schematic drawings demonstrating the positioning of the rotor in accordance with the invention.
Figure 2B:
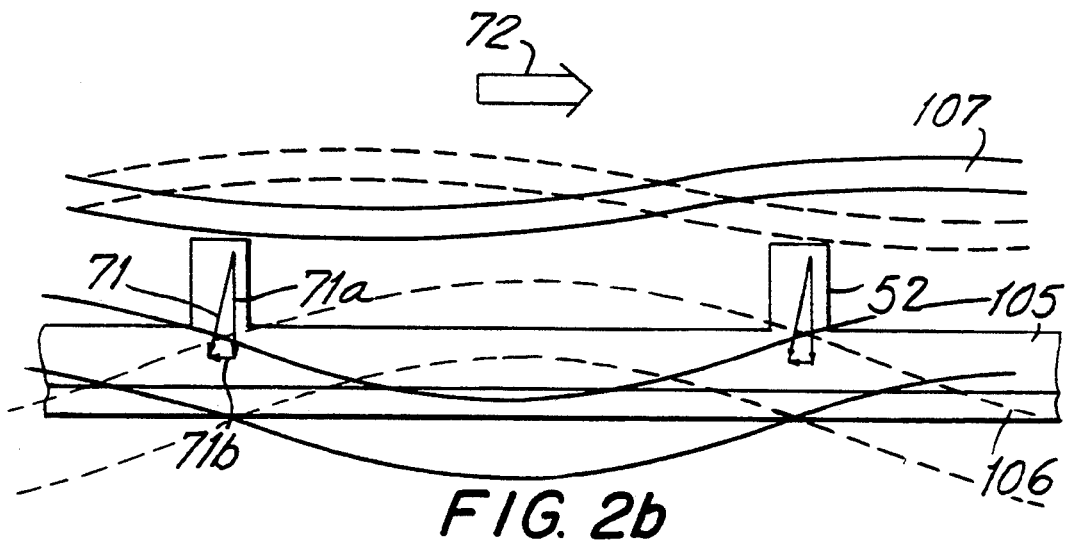
Figure 2C:
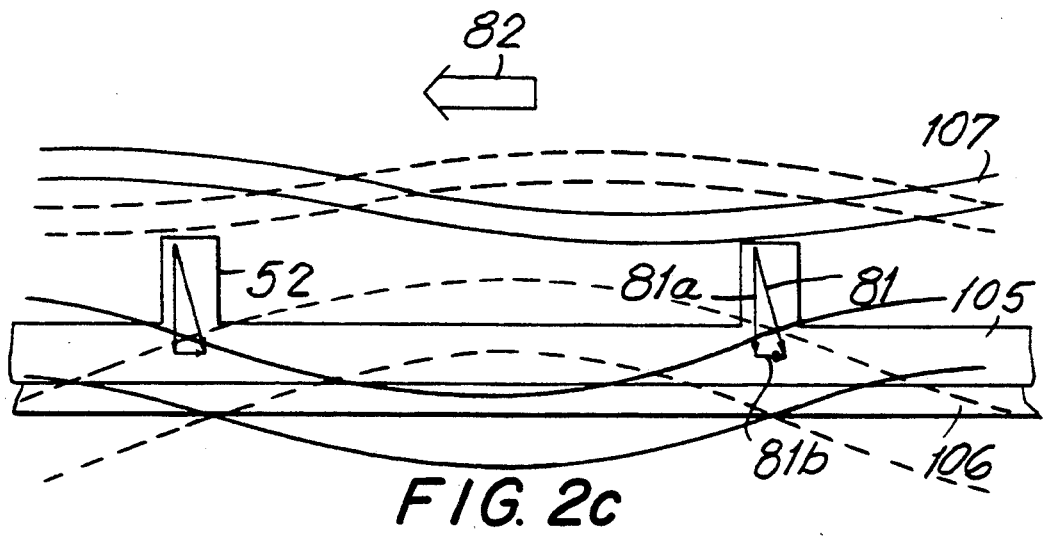

Reference is now made to FIGS. 2a through 2c, where the positioning of rotor 107 of ultrasonic step motor 100 in accordance with the present invention is provided. Stator 105 is provided with relief portions 51 separating adjacent contact projections 52 which are in contact with rotor 107. Vibrator 106, formed as a piezoelectric ceramic or the like is mounted on stator 105 so that stator 105 is disposed between vibrator 106 and rotor 107. A standing wave vibration is induced on rotor 107 through stator 105 by excitation of vibrator 106. Nodes 107a are formed on the wave formed by rotor 107 at selected positions which are determined by the driving method employed. The vibrating condition, the wave exhibited by rotor 107 at different periods of time, is shown by the solid and dashed lines.

If the position of a node 107a is to the left of the corresponding contact projection 52 of stator 105, as shown in FIG. 2b, rotor 107 presses against the contact projection 52 only when rotor 107 is deformed downwardly; applying a force in the direction of arrow 71. This force can be resolved into a vertical force 71a and a horizontal force 71b. Thus, the rotor 107 is moved in the direction of the arrow 72 by a counteraction of the horizontal force 71b acting on the downwardly extending portion of rotor 107. If the position of node 107a is to the right of the corresponding contact projection 52 of stator 105, as shown in FIG. 2c, rotor 107 applies a force in the direction of the arrow 81, which is in an opposite direction to that of arrow 72, the force consisting of vertical force component 81a and a horizontal force component 81b, so that rotor 107 is moved in the direction of the arrow 82 by the horizontal force 81b. Accordingly, rotor 107 moves in such a manner that contact projection 52 of the stator 105 and the positions of nodes 107a of the rotor 107 coincide with each other. In other words, if the waveform of the vibration mode of stator 105 has been predetermined, rotor 107 is set in a predetermined position as determined by the positioning of the nodes and contact projections.

Figure 3:
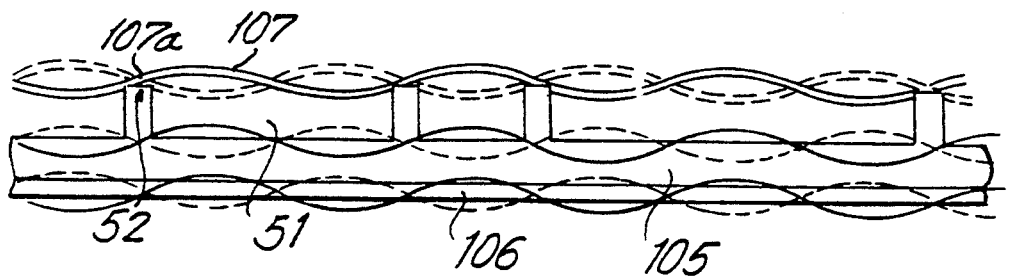
FIG. 3 is a schematic drawing showing the relationship between a vibration mode of the rotor and the contact projections of the stator in accordance with the invention.

FIG. 3 illustrates one example of the relationship between a vibration mode of rotor 107 and the contact projections 52 of stator 105. Contact projections 52 are not provided to correspond to each and every position of nodes 107a. Since it is only necessary that each contact portion 52 come in contact with a portion of rotor 107 which is in the vicinity of a corresponding node 107a and if the vibration amplitude is small, there is no particular restriction on the configurations of the contact projections 52 and the relief portions 51, nor is there a particular restriction on the order of vibration mode.

Figure 4:
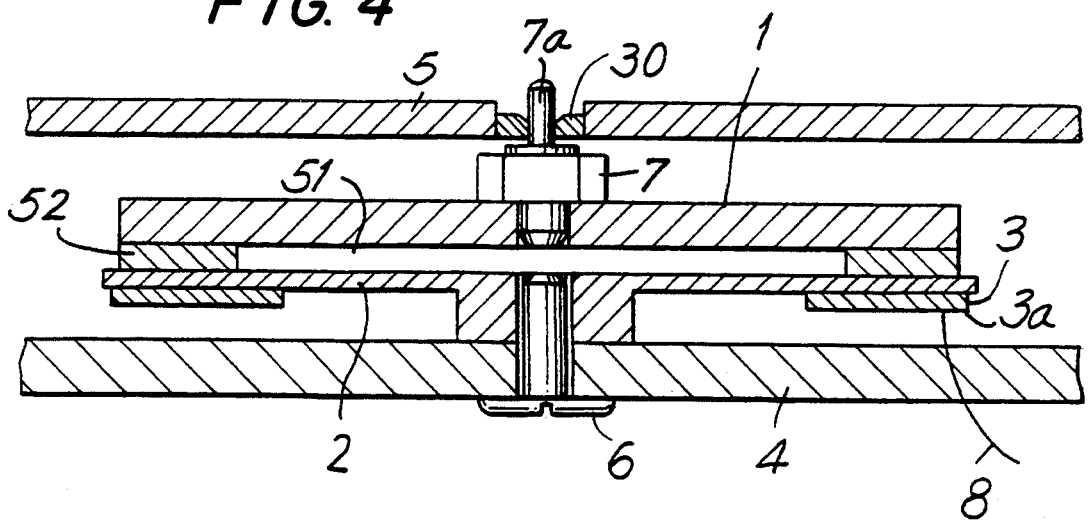
FIG. 4 is a sectional view of one embodiment of the ultrasonic step motor of the present invention.

Reference is now made to FIG. 4 wherein a sectional view of an ultrasonic step motor constructed in accordance with one embodiment of the invention is provided. The ultrasonic step motor is a rotary type motor. A ground plate 4 supports a stator 2. Stator 2 is affixed to ground plate 4 with a screw 6. Stator 2 is provided with contact projections 52 thereon separated by relief portions 51. A rotor 1 is disposed in frictional contact onto stator 21. A pinion 7 is press fit within rotor 1 and the end portion 7A thereof is rotatably supported within a guide plate such as a wheel train support 5 by jewel bearing 30. A piezoelectric ceramic vibrator 3 is mounted on stator 2 so that stator 2 is disposed between rotor 1 and piezoelectric vibrator 3. An electrode pattern 3a is formed on piezoelectric vibrator 3 and is coupled to a voltage source such as a battery through lead wires 8.

Relief portions 51 are designed to allow rotor 1 to vibrate without interference, and contact projections 52 are designed to contact rotor 1 to frictionally drive rotor 1. In this arrangement, the piezoelectric ceramic, i.e., the vibrator 3, is distorted when subjected to a voltage, causing a flexural vibration to be induced on stator 2. The vibration is transmitted to rotor 1 through the contact projections 52, thus generating a flexural vibration of a standing wave in rotor 1. If rotor 1 vibrates in a standing wave at or near the resonance frequency, rotor 1 will travel in a certain direction as a result of the vibration mode due to variations in the manufacture and in the properties of the material used for rotor 1 even if rotor 1 is disk-shaped, so that the rotor 1 travels in a determined direction and eventually becomes stationary in a specific direction with respect to contact projections 52 of stator 2, as shown in FIGS. 2a–2c. If vibrator 3 is vibrated in a plurality of conditions to form a travelling wave on stator 2, rotor 1 is driven continuously by contact projections 52. Accordingly, if the drive mode for stator 2 is switched between travelling and standing wave vibrations, rotor 1 is switched between continuous rotation mode and the fixed positioning mode. For example, if rotor 1 has three nodal diameters and stator 2 has contact projections 52 which are provided in all or any of the six divided positions, the rotor 1 can be driven to rotate through 360° in six discrete steps.

Figure 5:
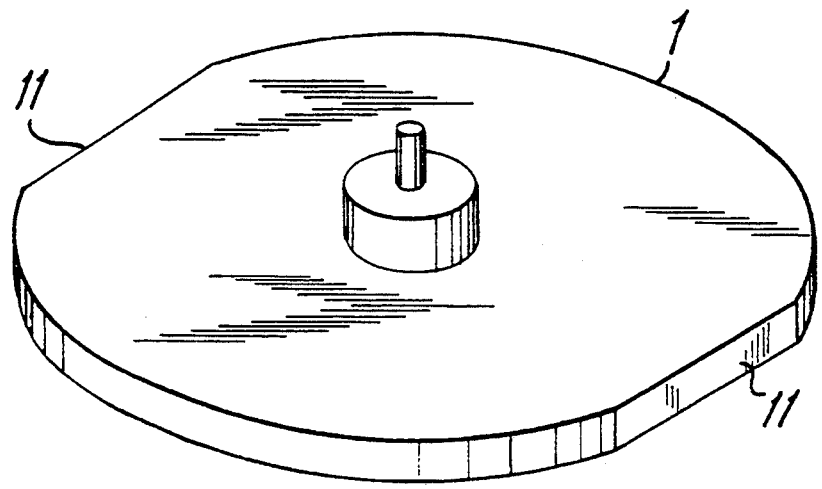
FIG. 5 is a perspective view of a first embodiment of a rotor constructed in accordance with the present invention.

FIG. 5 is a perspective view of a first embodiment of rotor 1 of the ultrasonic step motor according to the present invention. Rotor 1 is formed with two cut portions 11 at opposed sides from each other. Cut portions 11 set the direction of the vibration mode of rotor 1 in a preselected direction in the resonance condition. With this arrangement, the degeneration of vibration modes is readily resolved, and a vibration mode is formed only in a predetermined direction.

Figure 6:
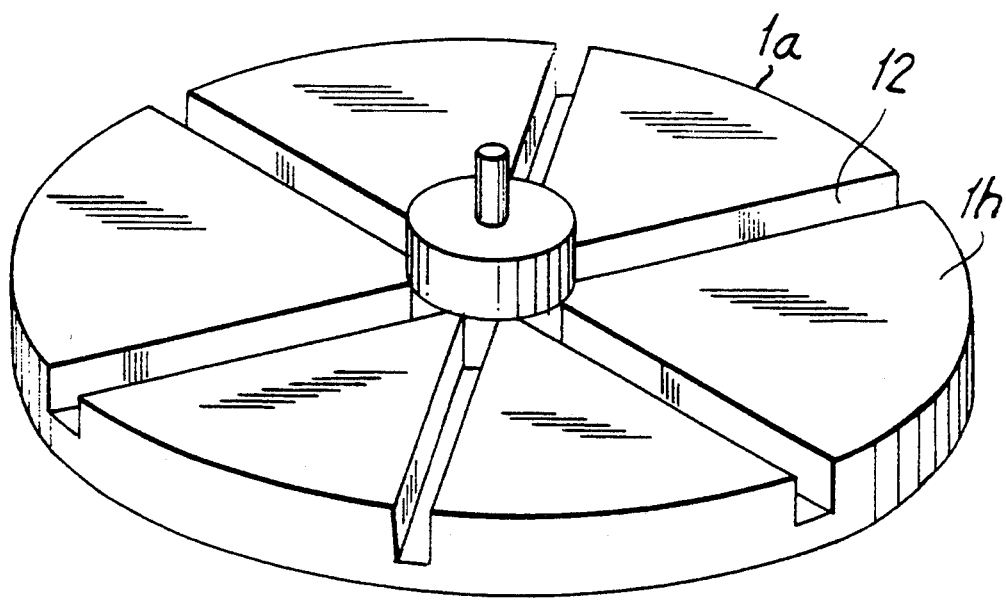
FIG. 6 is a perspective view of a second embodiment of the rotor constructed in accordance with the invention.

Reference is now made to FIG. 6 in which a perspective view of a rotor 1a constructed in accordance with a second embodiment of the invention is provided. The upper surface 1h of rotor 1a is provided with slits 12 extending radially along upper surface 1h so that distributions are formed along rotor 1a in terms of the degree of rigidity of rotor 1a and the size of the mass along rotor 1a. The direction of the vibration mode exhibited by rotor 1a is predetermined as a function of the rigidity and mass distribution of rotor 1a.

Figure 7:
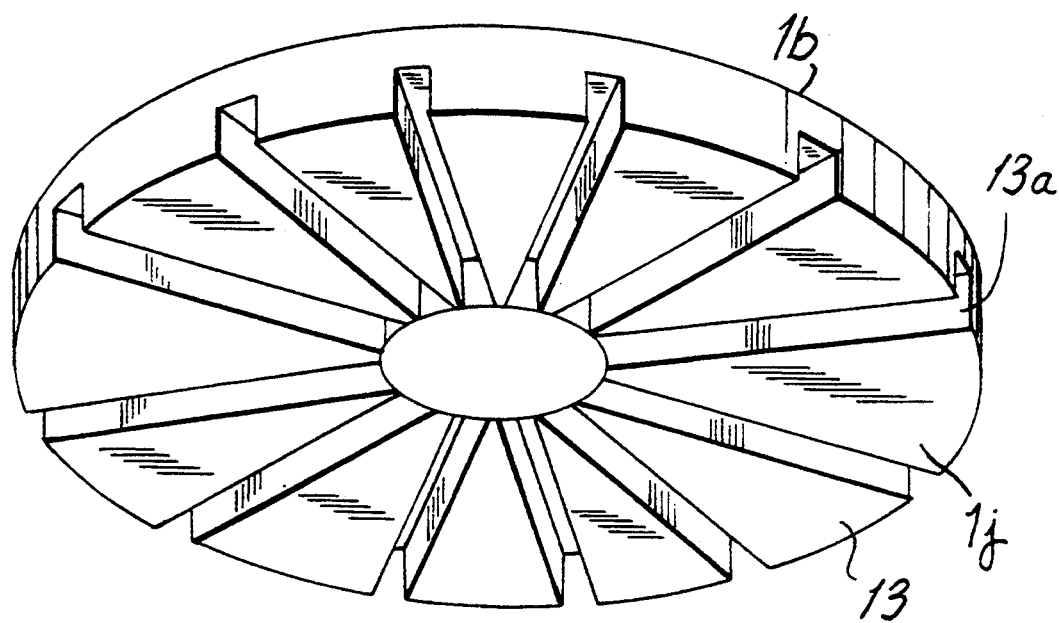
FIG. 7 is a perspective view of a third embodiment of the rotor constructed in accordance with the invention.

Reference is now made to FIG. 7 in which perspective view of a rotor 1b constructed in accordance with a third embodiment of the present invention is provided. The lower surface 1j of rotor 1b is provided with radial slots 13a separating projections 13. With this arrangement, distributions are formed along rotor 1b in terms of the degree of the rigidity of rotor 1b and the size of the mass so that the direction of the vibration mode is predetermined as discussed above in connection with rotor 1a. Since projections 13 have high rigidity and come in contact with projections 52 of stator 2, nodes are readily formed.

In the embodiment shown in FIGS. 6 and 7, if the rigidity and mass distributions are equidivisional and correspond to the nodes of the vibration mode of the stator, the rotor can be forcibly vibrated. In other words, it is possible to generate a vibration in which nodes are formed by portions which are high in terms of rigidity and mass even at a frequency other than the resonance frequency.

Figure 8A:
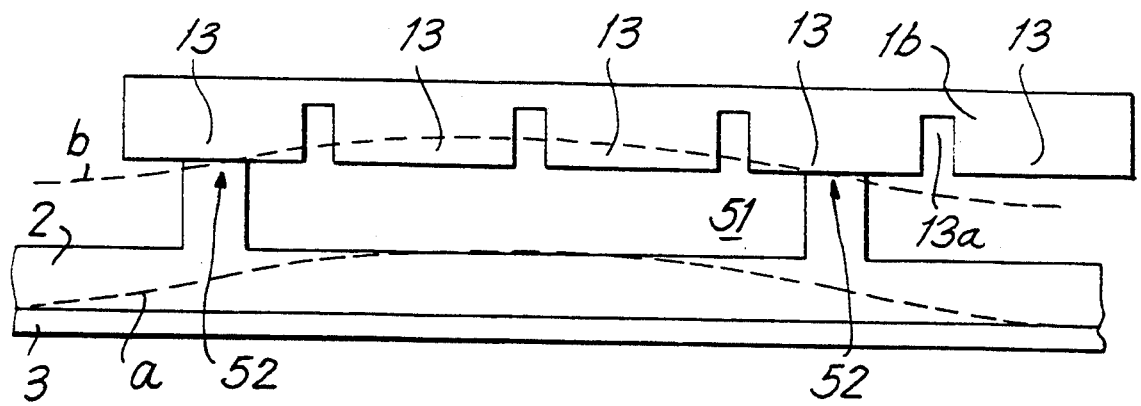
FIGS. 8a, 8b and 8c are schematic drawings demonstrating the manner in which the rotor is forcibly vibrated in accordance with the invention.
Figure 8B:
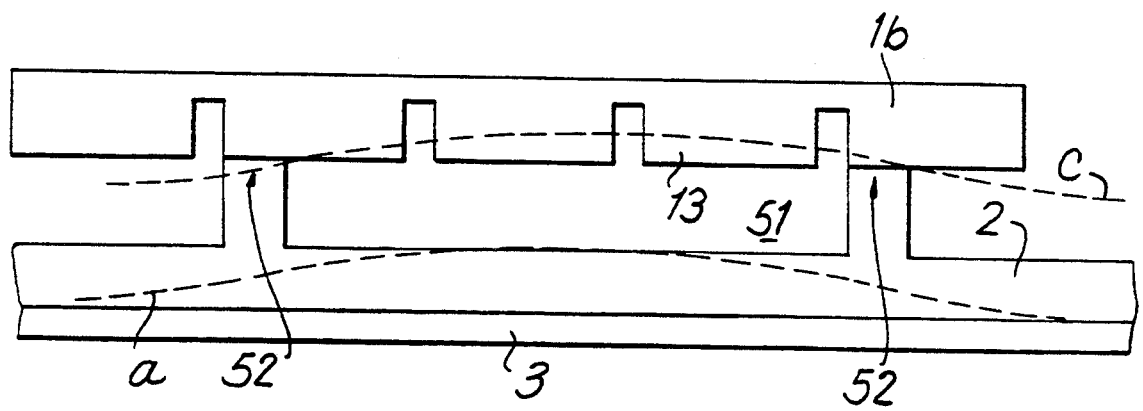
Figure 8C:
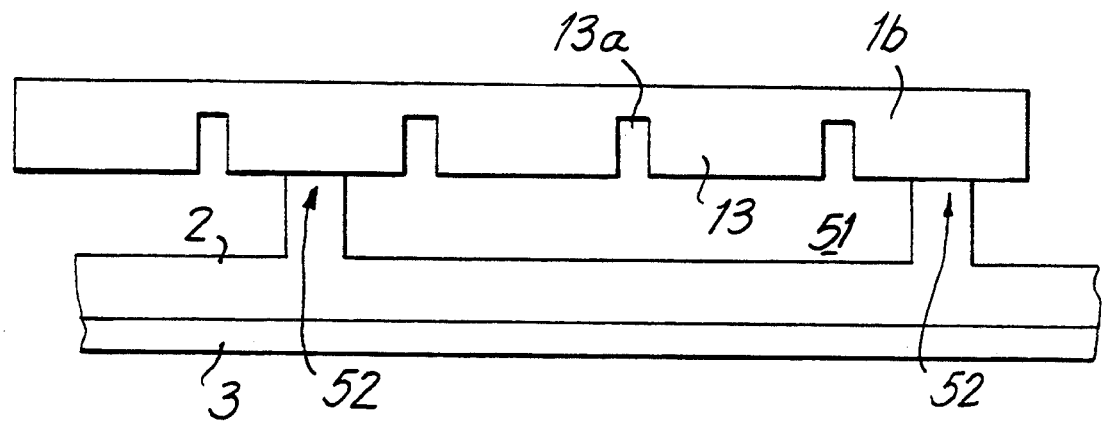

FIGS. 8a–8c illustrate the way in which rotor 1b of the ultrasonic stepping motor of the present invention is forcibly vibrated. In these figures, a linear ultrasonic step motor is shown as an example of the present invention. Stator 2 is vibrated in the standing wave mode, as shown by the dashed line a, by vibrator 3 attached thereto. Contact projections 52 of stator 2, which are provided at respective positions corresponding to the nodes of the standing wave vibration, are in contact with rotor 1b. Since rotor 1b has projections 13 provided at respective positions which are equally divided per vibration node of stator 2, rotor 1b is forcibly driven in a vibration mode (with the same shape as that of the vibration mode of the stator), shown by the dashed line b, in which the projection 13 at a selective position forms a node. Accordingly, rotor 1 is stabilized in the position shown in FIG. 8a.

If a travelling wave is exhibited by stator 2, rotor 1b moves to the left. If a standing wave is again exhibited by stator 2, the vibration mode, shown by the chain line a, is again exhibited by stator 2 as shown in FIG. 8b and rotor 1b exhibits a vibration mode, shown by the chain line c, which is shifted to the right with respect to the vibration mode shown in FIG. 8a. Accordingly, rotor 1b moves in a direction in which the vibration modes of the rotor and the stator 2 are superimposed according to the principle illustrated in FIGS. 2a–2c, so that the net result is rotor 1b being positioned, as shown in FIG. 8c. As will be clear from the foregoing, with a rotor in which the rigidity and mass are divisionally distributed, a vibration mode is formed on the stator and the rotor in a selected direction, and the rotor can be driven stepwise in accordance with the number by which the rigidity and mass of the rotor are divided.

Figure 9:
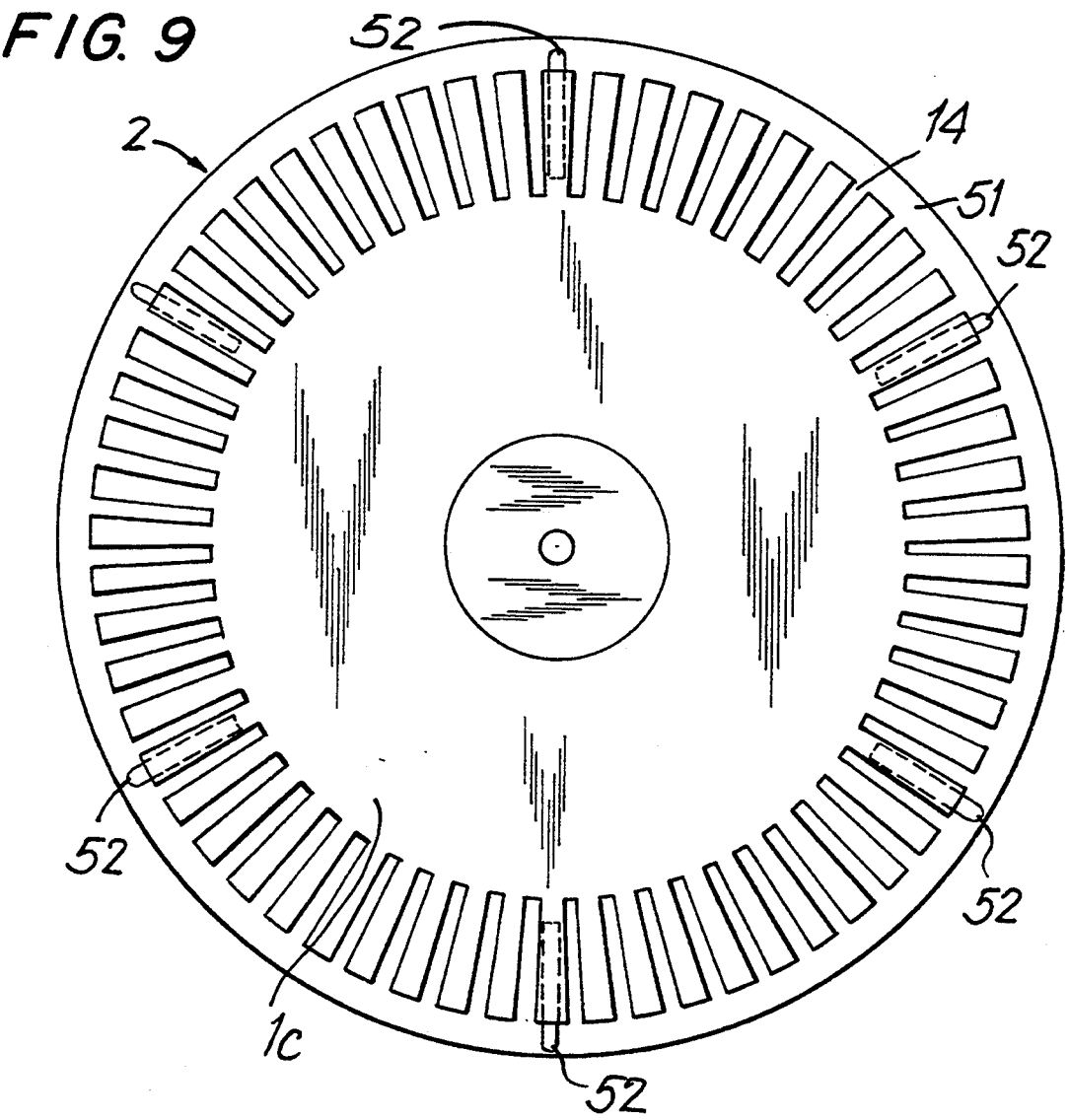
FIG. 9 is a perspective view of a fourth embodiment of the rotor constructed in accordance with the invention.

FIG. 9 is a top plan view of a rotor 1c constructed in accordance with a fourth embodiment of the invention. Rotor 1c is provided with, for example, sixty slits 14, while the stator 2 is provided with, for example, six divisions each consisting of a contact projection 52 and a relief portion 51. Slits 14 in rotor 1c can be readily formed by press working or other similar means. The structure of rotor 1c and stator 2 results in six combinations of directions of nodes, so that the rotor 1 can be driven to rotate through 360° in six discrete steps.

Figure 10:
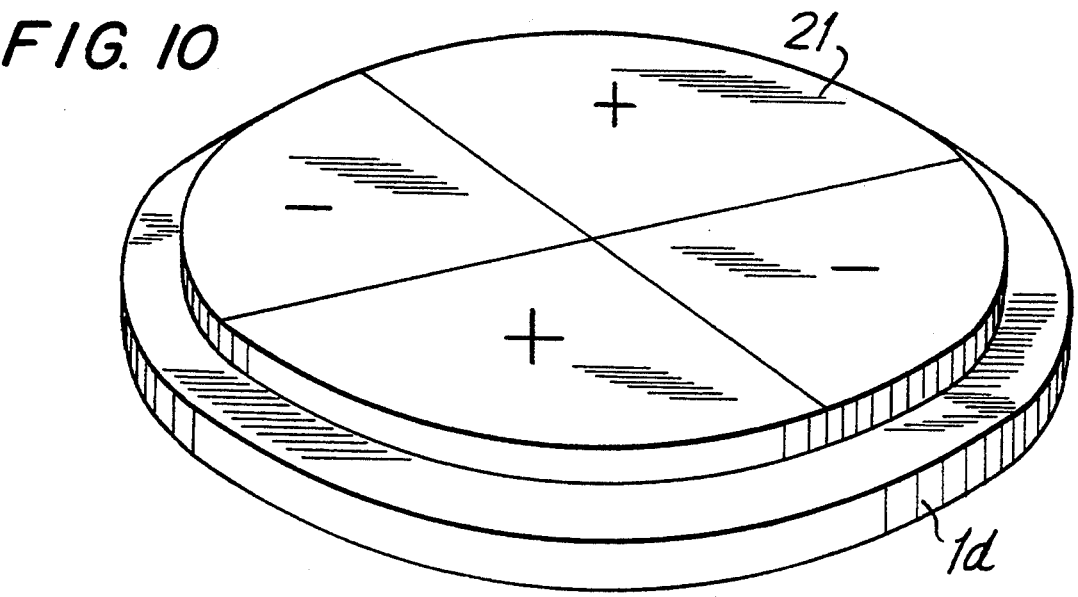
FIG. 10 is a perspective view of a fifth embodiment of the rotor constructed in accordance with the invention.

Reference is now made to FIG. 10 in which a perspective view of rotor 1d constructed in accordance with a fifth embodiment of the invention is provided. A vibrator 21 is mounted on rotor 1d. Vibrator 21 is a piezoelectric ceramic vibrator or the like. The signs + and − denote directions of polarization of vibrator 21. By externally applying an alternating voltage, a vibration mode such as a 4λ standing wave vibration mode by way of example is generated. By mounting vibrator 21 on rotor 1d, positioning can be effected independently of the vibrating condition of the stator. Even if no alternating voltage is applied externally to rotor 1d, when the rotor 1d is vibrated by exciting the stator an electric charge is induced on the piezoelectric ceramic vibrator 21. The resulting field produces the same effect as if a voltage is applied externally to rotor 1d.

It should be noted that in the configuration of rotor 1d, the polarization pattern of piezoelectric ceramic vibrator 21 and so forth are not limited to the arrangement of this embodiment. Although the ultrasonic step motor of the present invention has been detailed by way of some embodiments, it should be noted that the foregoing embodiments and arrangements for forming a vibration mode in a specific direction are shown by way of example and that the present invention is not limited to the arrangements of the described embodiments, but it is possible to adopt any arrangement which enables attainment of the object of the present invention. For example, the density, rigidity, and the like may be varied by employing a composite material rather than forming channels and projections.

Figure 11:
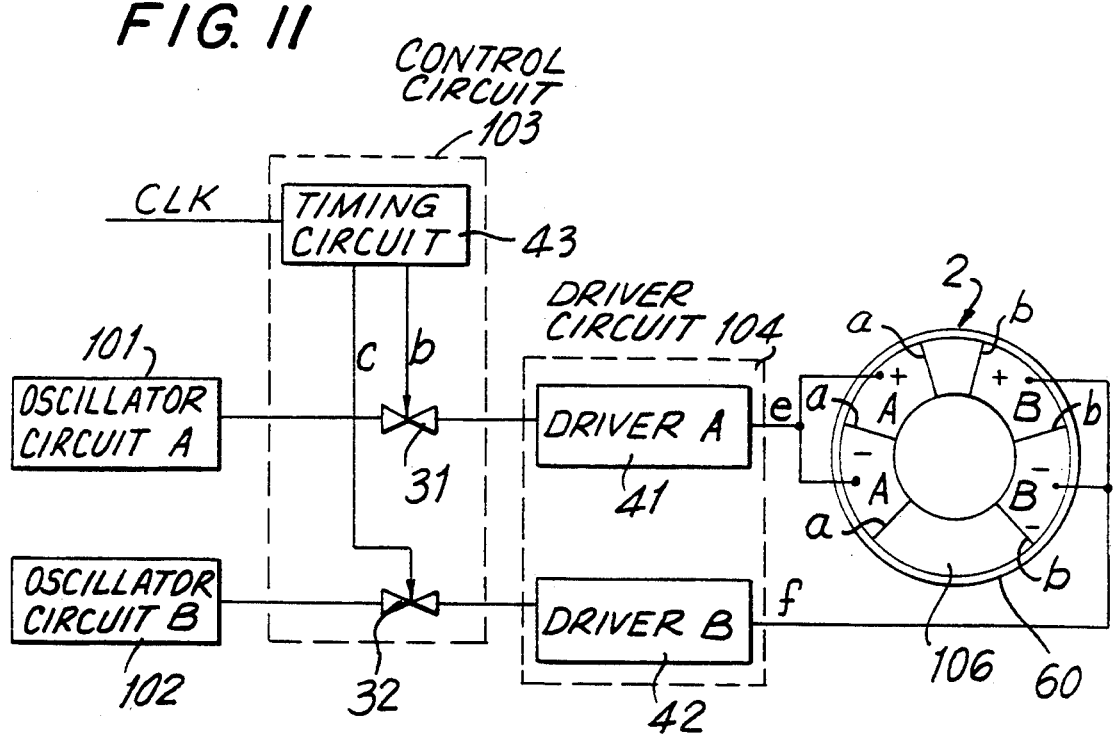
FIG. 11 is a block diagram of a first embodiment of a driving circuit for driving the ultrasonic step motor of the present invention.

Reference is now made to FIG. 11 in which a circuit diagram of a driving circuit for the ultrasonic step motor 100 is provided. Control circuit 103 includes a timing circuit 43 which outputs signals b and c in response to a reference signal CLK. A first changeover switch 31 receives the output of oscillator circuit A 101 and outputs the signal from oscillator circuit A 101 in response to signal b to a driver A 41 of driver circuit 104. Similarly, a second changeover switch 32 receives the output of oscillator circuit B 102 and in response to signal c outputs the signal to a driver B 42 of driver circuit 104. Driver A 41 and driver B 42 provide output signals e and f respectively to a vibrator 106 mounted on stator 2.

Control circuit 103 switches between the outputs of oscillator circuit A 101 and B 102 utilizing changeover switches 31 and 32 in response to reference signal CLK. Changeover switches 31, 32 may be transmission gates or the like. Vibrator 106 includes a piezoelectric ceramic 60 polarized positive (+) and negative (−) across the (sectors defining end of phases A and B) of vibrator 106. The polarization angles of the sectors defining phases A and B of piezoelectric ceramic 60 are by way of example. When a voltage signal e is applied to portions of vibrator 106 defining phase A through driver A 41, a 3λ vibration mode having a node at boundary positions a, each 60° apart, is generated. When portions of vibrator 106 defining phase B are driven by a voltage signal f through driver B 42, a 3λ vibration mode having a node at boundary positions b, each 60° apart, is generated. In this arrangement, if the portions defining phase A or phase B are driven singly, a standing wave is formed in that position, whereas, if driving of both the portions defining phases A and B of vibrator 106 is effected with signals e and f, since the portions (phases)

are 90° out of phase with each other, a travelling wave is formed.

Figure 12:
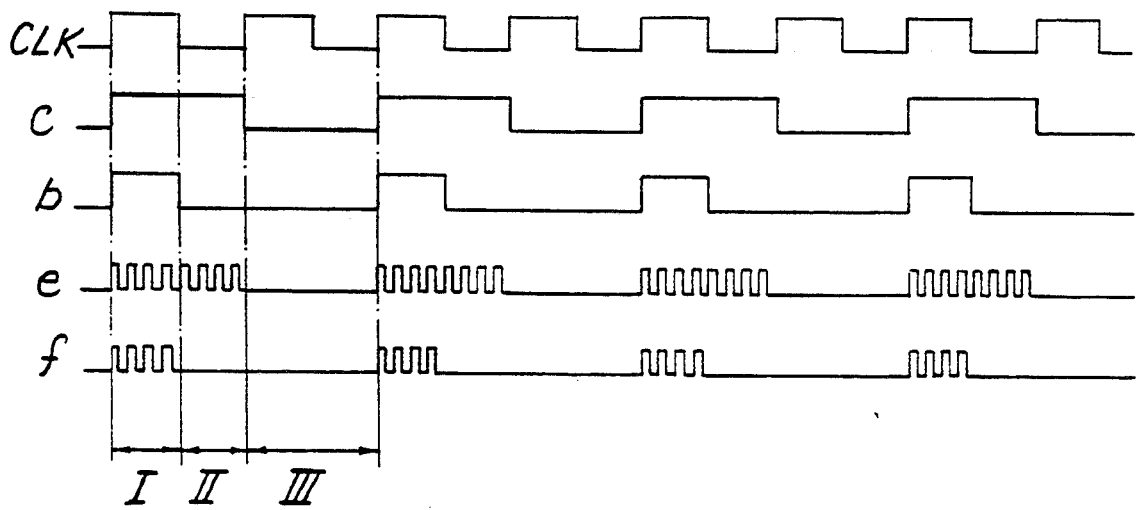
FIG. 12 is a timing chart showing the signal waveforms of the circuit shown in FIG. 11.

As seen in FIG. 12, the signals from the oscillator circuits A 101 and B 102 are selectively output in a non-overlapping manner by changeover switches 31, 32 in response to switching signals c and d which are delivered synchronously with reference signals CLK, so that signals e and f are applied to the vibrator. Since the oscillator circuits A 101 and B 102 are equal in frequency but 90° out of phase with each other, during the period I a travelling wave is formed to rotate the rotor, during the period II a standing wave is formed at the boundary position a to position the rotor, and during the period III no vibration is generated, so that the rotor does not move and it is therefore unnecessary to supply electric power.

Since the object of the embodiment shown in FIGS. 11 and 12 is to switch between the generation of a travelling wave, the generation of a standing wave and the suspension of the excitation, there is no particular restriction on the order of vibration mode, the way of excitation, the driving timing and duration, or the like. The standing wave may be generated in such a way that the rotor is fed intermittently by generation of a progressive wave and it is positioned at times by generation of a standing wave. In addition, the standing wave may be generated either by driving the portions A or by driving the portions B. It is also possible to cosine together these two excitation phases or modes.

Figure 13:
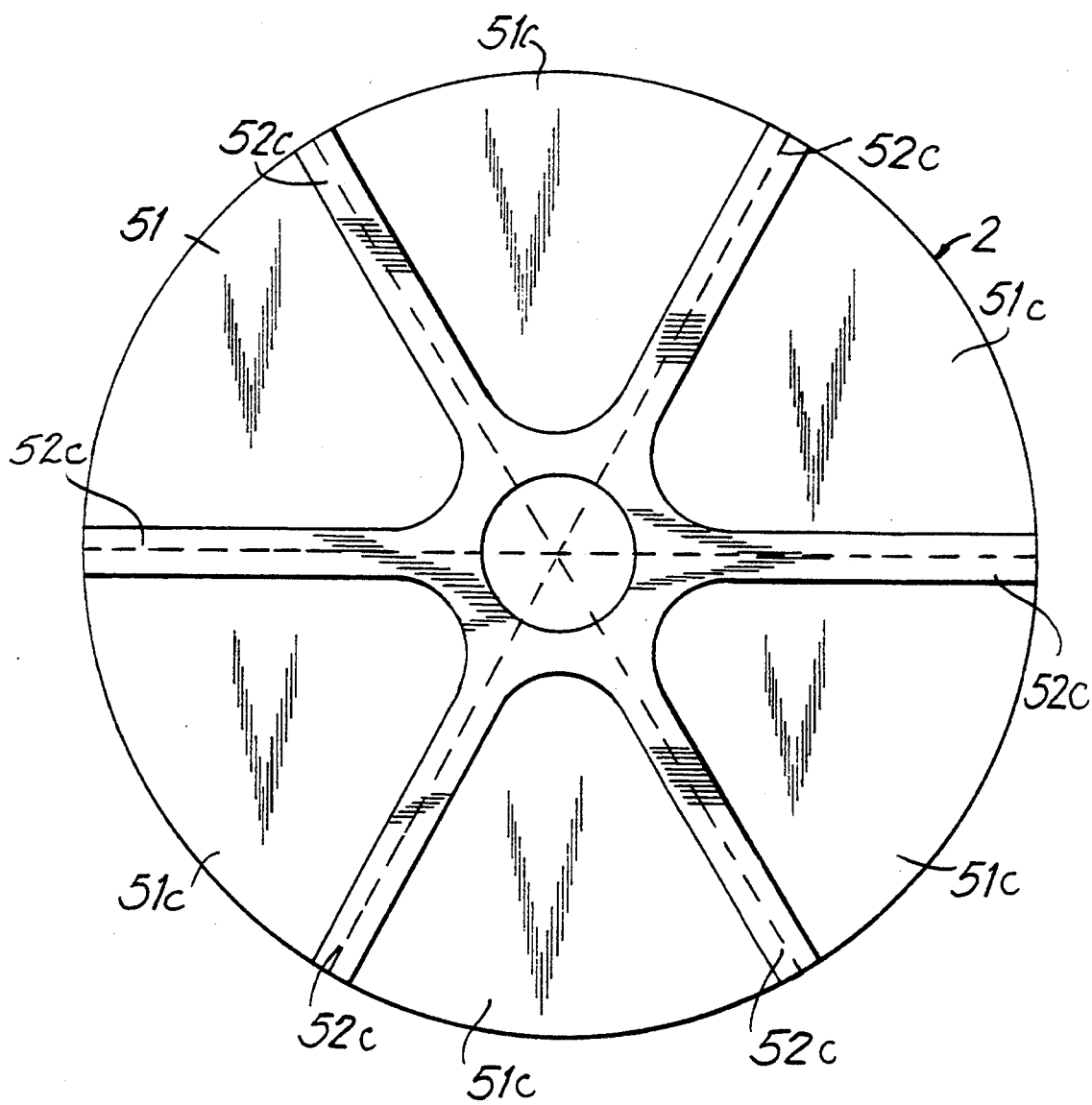
FIG. 13 is a top plan view of a first embodiment of a stator constructed in accordance with the present invention.

Reference is now made to FIG. 13 in which a top plan view of a first embodiment of stator 2 constructed in accordance with the invention is provided. A 3λ vibration mode is generated on the stator 2, as shown by the dashed lines provided at nodal diameters. Stator 2 is formed with relief portions 51c at respective positions separating contact projections 52c. Relief portions 51c correspond to the antinodes, or loops, of the vibration mode in order not to interfere with the flexural vibration of the rotor. Contact projections 52c, are disposed at respective positions which correspond to the nodes of the vibration mode. Contact projections 52c are in frictional contact with the rotor. In this arrangement, there is no interference between the flexural vibrations of stator 2 and the rotor and it is easy for the contact projections 52c to form nodes. Accordingly, a stable vibration mode is obtained.

Figure 14:
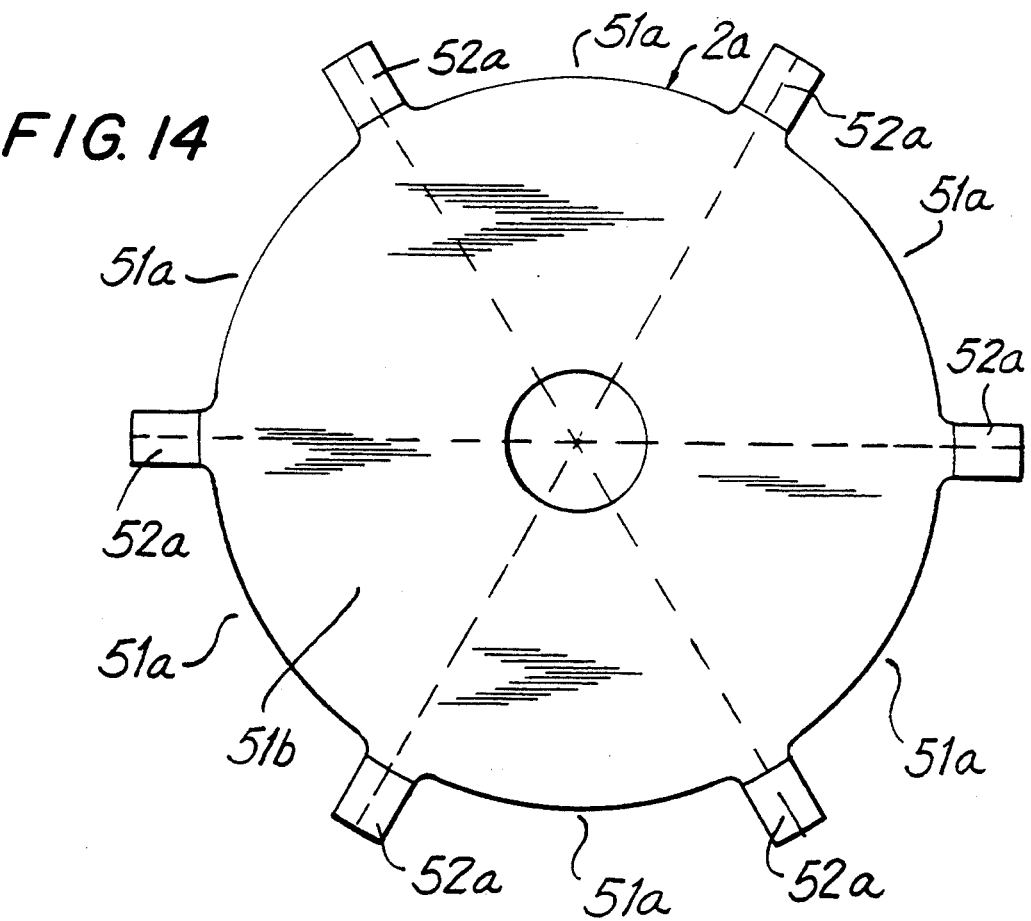
FIG. 14 is a top plan view of a second embodiment of a stator constructed in accordance with the invention.

Reference is now made to FIG. 14 in which a top plan view of a stator 2a constructed in accordance with a second embodiment of the invention is provided. Stator 2a is provided with contact projections 52a which are formed only on the outer peripheral portion of the stator 2a beyond the circumference of the disk forming the inner portion of stator 2. Stator 2a is formed with an inner relief portion 51b and outer peripheral relief portions 51a formed as gaps separating contact projections 52 for avoiding interference with the rotor. In this arrangement, nodes are formed at the positions shown by the dashed lines. In addition, the contact projections 52a can be readily formed by cutting the outer periphery forming peripheral relief portions 51a by gear milling or other similar means.

Figure 15:
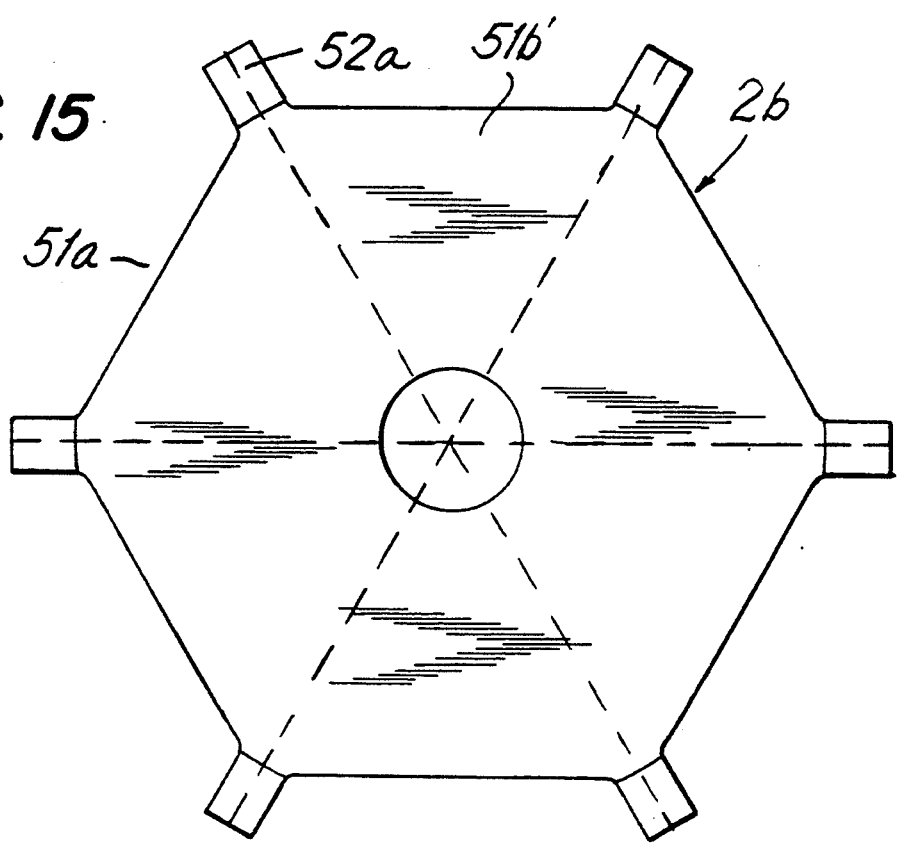
FIG. 15 is a top plan view of a third embodiment of the stator constructed in accordance with the invention.

Reference is now made to FIG. 15 in which a top plan view of stator 2b constructed in accordance with a third embodiment of the invention is provided. Like numerals are utilized to indicate like parts, the primary difference between stator 2b and stator 2a being that inner relief portion 51b' of stator 2b is not in a substantially circular form but in axial symmetry with respect to the center. Stator 2b has in inner relief portion 51b' and contact projection 52a formed beyond the periphery of relief portion 51b. Accordingly, nodes are formed at the positions shown by the dashed lines, and the stator 2c can be readily machined in the same way as stator 2a.

By providing stators with relief portions as in stators 2a, 2b, the stator is formed with relief portions so that the flexural vibrations of the stator and the rotor will not interfere with each other. Additionally, the vibration is stabilized by allowing the stator to come in contact with the rotor at the portions corresponding to the nodes of the vibration and not at the antinode or flex portions of the waveform. There is therefore no particular restriction on the configurations of the relief and contact portions, the type of vibration mode or the like.

Figure 16A:
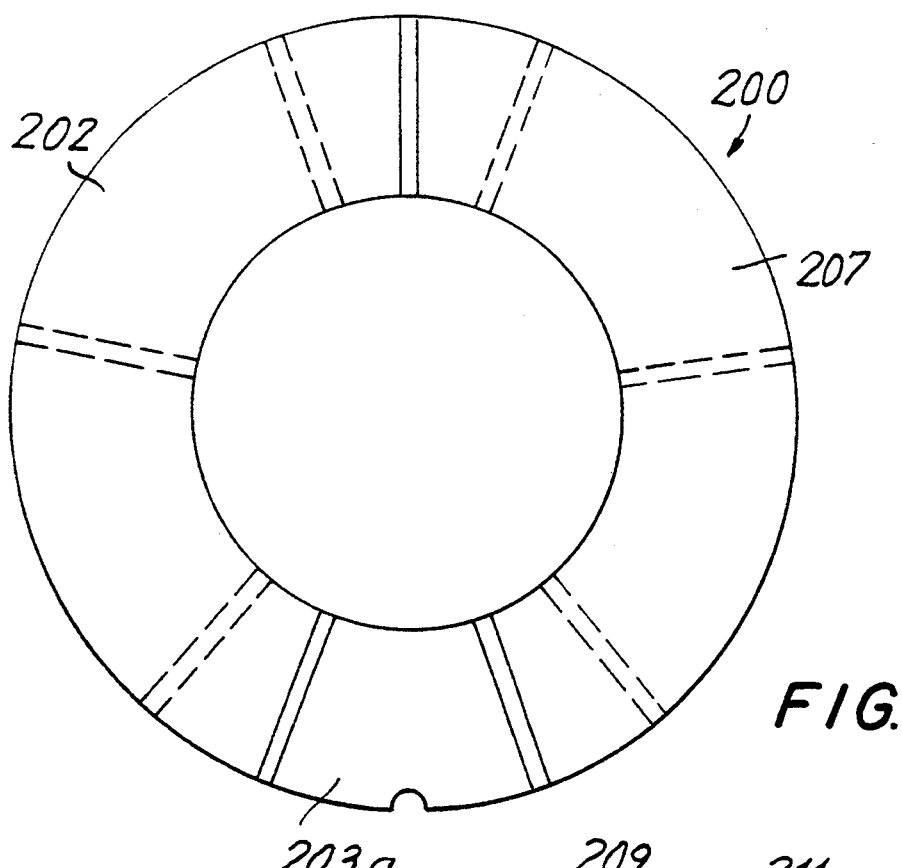
FIGS. 16a and 16b are a top plan view and bottom plan view respectively of a piezoelectric ceramic constructed in accordance with one embodiment of the present invention showing the polarization patterns.
Figure 16B:
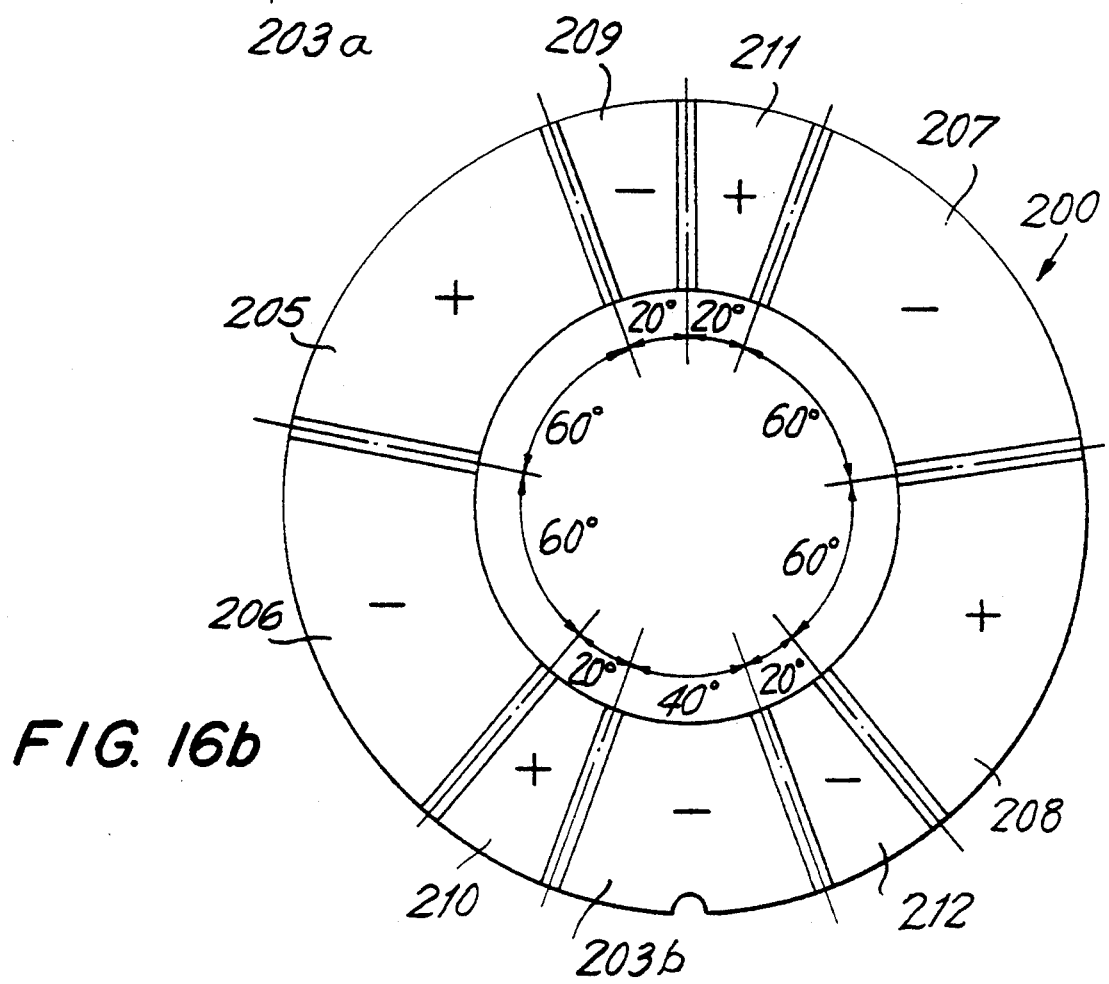

Reference is now made to FIG. 16 in which an embodiment illustrating the arrangement of vibrating sections of the piezoelectric ceramic and the configuration of driving portions is illustrated. The signs + and − in the figure denote the directions of polarization of the piezoelectric ceramic. FIG. 16a is a plan view of the obverse side of a piezoelectric ceramic 200, while FIG. 16b is a plan view of the reverse side of piezoelectric ceramic 200. Reference numerals 205, 206, 207 and 208 denote polarized sections of piezoelectric ceramic 200 corresponding to ½ of the wavelength of a vibration wave.

Since the arrangement shown in FIG. 16b is designed so that a vibrating wave with a size corresponding to 3 wavelengths is produced on the circumference of the elastic member, the polarized sections 205, 206, 207 and 208 each correspond to one sixth of the circumference of the elastic member and hence comprise ½ of the wavelength of the vibratory wave. Polarized sections 209, 210, 211 and 212, which are smaller than the polarized sections 205, 206, 207 and 208, each correspond to 1/6 of the wavelength of the vibratory wave. The polarized sections 209 and 210 are located at the extremities, respectively, of the phase A (see FIG. 11 by way of example), whereas the polarized sections 211 and 212 are located at the extremities, respectively, of the phase B. Thus, phase A is formed in a well-balanced condition with the polarized sections 205, 206, 209 and 210 configured in axial symmetry relative to the phase B. Conversely, phase B is also formed in a well-balanced conditions with the polarized sections 207, 208, 211 and 212 configured in axial symmetry with phase A. The phases A and B are formed spatially on the circumference with a phase difference corresponding to ¼ of the wavelength of the vibration wave. A polarized section 203b on the reverse side is a section for detecting the state of a vibratory wave produced on the elastic member. Reference numerals 201, 202 and 203a on the obverse side denote an electrode A, an electrode B and a detecting electrode, respectively.

If a stator of an ultrasonic motor is formed by bonding the reverse side of piezoelectric ceramic 200 to an elastic member, a voltage of equal potential can be applied to the reverse side of the piezoelectric ceramic, which is defined as a common electrode.

First, an alternating voltage of a proper frequency is applied between the electrode 201 and the common electrode. In consequence, a standing wave in which nodes are formed at the boundary between the polarized sections 205 and 206 of phase A and at the two extremities thereof is produced throughout the stator since phase A is formed in axial symmetry and in a well-balanced condition. This wave is defined as a first standing wave, and this driving state as a first driving state. Next, a second driving state is produced by applying an alternating voltage of the same frequency as in the first driving state between the electrode 202 and the common electrode. Since phase B is also formed in axial symmetry and in a well-balanced condition, a second standing wave in which nodes are formed at the boundary between the polarized sections 207 and 208 of the phase B and at the two extremities thereof is produced throughout the stator. Further, a third driving state is produced by applying voltages of the described frequency in phase between the electrode 201 and the common electrode and between the electrode 202 and the common electrode. In consequence as will be shown in FIGS. 20a–20c, a composite wave of the first and second standing waves is produced throughout the stator. The nodes of the composite wave are located at positions intermediate between the nodes of the first standing wave and those of the second standing wave.

Reference is now made to FIGS. 17a and 17b in which a rotor 213 constructed in accordance with another embodiment of the invention is provided. Rotor 213 is formed with six cut portions providing six projections 213a on the circumference of rotor 213 for use in a motor. Rotor 213 is formed with a pinion 213b and support pivot 213c. If rotor 213 is brought into press contact with the above-described stator and a standing wave is produced on the stator, the projections 213a of rotor 213 are subjected to a force in the direction from the antinodes or loops towards the nodes of the standing wave exhibited by the stator, so that the rotor is eventually stabilized to stop at the positions of the nodes, as is described in Japanese Patent Application No. 02-70324 (1990). Accordingly, if the above described first through third driving states are sequentially established in the mentioned order or in the reverse order, the node positions move about the circumference of the stator in response to the sequential change of the driving states. Rotor 213 which is in press contact with the stator also rotates together with the nodes. Since the phases A and B are formed with a phase difference corresponding to ⅑ of the wavelength, that is, a phase difference of 40°, the rotor is driven intermittently at regular intervals of 20°.

Figure 18A:
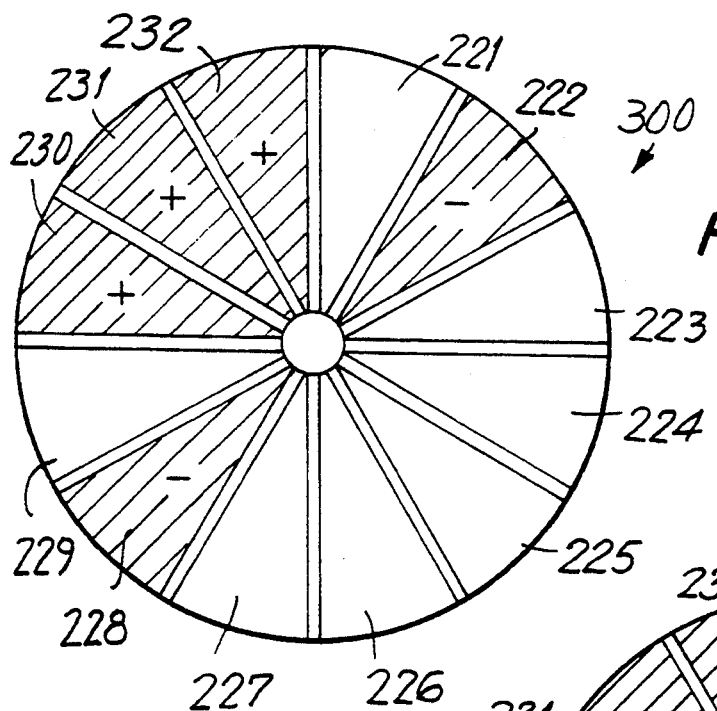
FIGS. 18a, 18b and 18c are top plan views of a piezoelectric ceramic vibrator constructed in accordance with another embodiment of the invention illustrating the polarization patterns therefor in connection with a driving method of the present invention.
Figure 18C:
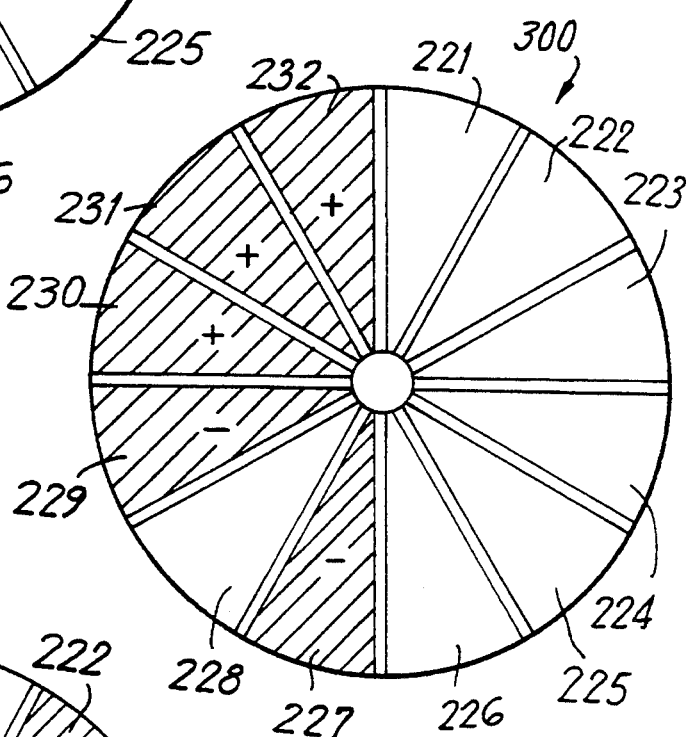
Figure 18B:
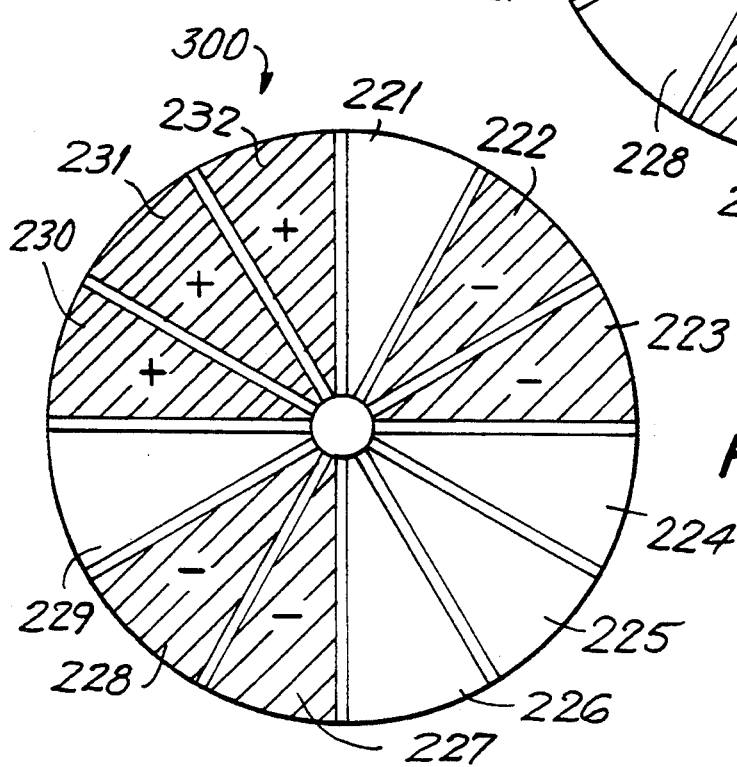

In the foregoing ultrasonic motor, the node positions of a standing wave produced by driving each phase independently and exclusively and the size of the amplitude thereof are also important for proper driving of the rotor, not to mention the resonance frequency of the standing wave. Although in this embodiment the phase difference between the phases A and B is ⅑ of the wavelength (=40°), it should be noted that the present invention is not necessarily limited thereto. The foregoing embodiment is an ultrasonic motor which is driven intermittently by use of standing waves in the phases A and B and a composite wave of the two standing waves. Reference is now made to FIGS. 18a–18c in which the operation of an ultrasonic motor which is driven intermittently utilizing only a standing wave without using a composite wave is provided.

FIGS. 18a–18c illustrate the driving of a piezoelectric ceramic vibrator 300 constructed in accordance with another embodiment of the invention driven as described above. Piezoelectric ceramic 300 is formed with twelve vibrator elements 221 through 232 forming sections which are polarized in the same direction. With the piezoelectric ceramic vibrator arranged in this way, if a standing wave with a size corresponding to two wavelengths is desired to be produced on the elastic member such that loops of the standing wave are formed at the positions of vibrator elements 231, 222, 225 and 228, vibrator elements 230–232, 222 and 228 which are shown by the hatched lines in FIG. 18a, should be driven. The signs + and − in the figure denote the polarities of the driving voltage during driving of piezoelectric ceramic vibrator 300. The driving portions are configured in axial symmetry as a whole. In FIG. 18b, the vibrator elements 223 and 227 are driven in addition to the driving sections shown in FIG. 18a. Again, the driving sections are configured in axial symmetry as a whole. In FIG. 18c, vibrator elements 227 and 229 through 232 which are hatched are driven. Vibrator elements 227, 228 and 229 correspond to a half-wavelength of the vibrating wave. Accordingly, in the vibrator elements corresponding to the half-wavelength, the driving portions are configured in axial symmetry. In the above described driving mode, the node positions of the vibrating wave are formed at the expected positions with high accuracy.

Although in the foregoing two embodiments the present invention has been described by way of one example in which the ultrasonic step motor is driven intermittently by use of standing waves, it should be noted that the present invention is not necessarily limited thereto. For example, the driving method may be such that alternating voltages which are temporarily out of phase with each other are applied to the phases A and B, respectively, to produce a travelling wave. In such a driving method the driving voltages are output intermittently so that the rotor is driven intermittently by the travelling wave, and the foregoing standing wave is produced at regular or arbitrary intervals of time. With this driving method, the error in rotation that occurs during the intermittent drive utilizing the travelling wave is cancelled when the standing wave is produced, so that there will be no cumulative error in rotation.

Figure 19:
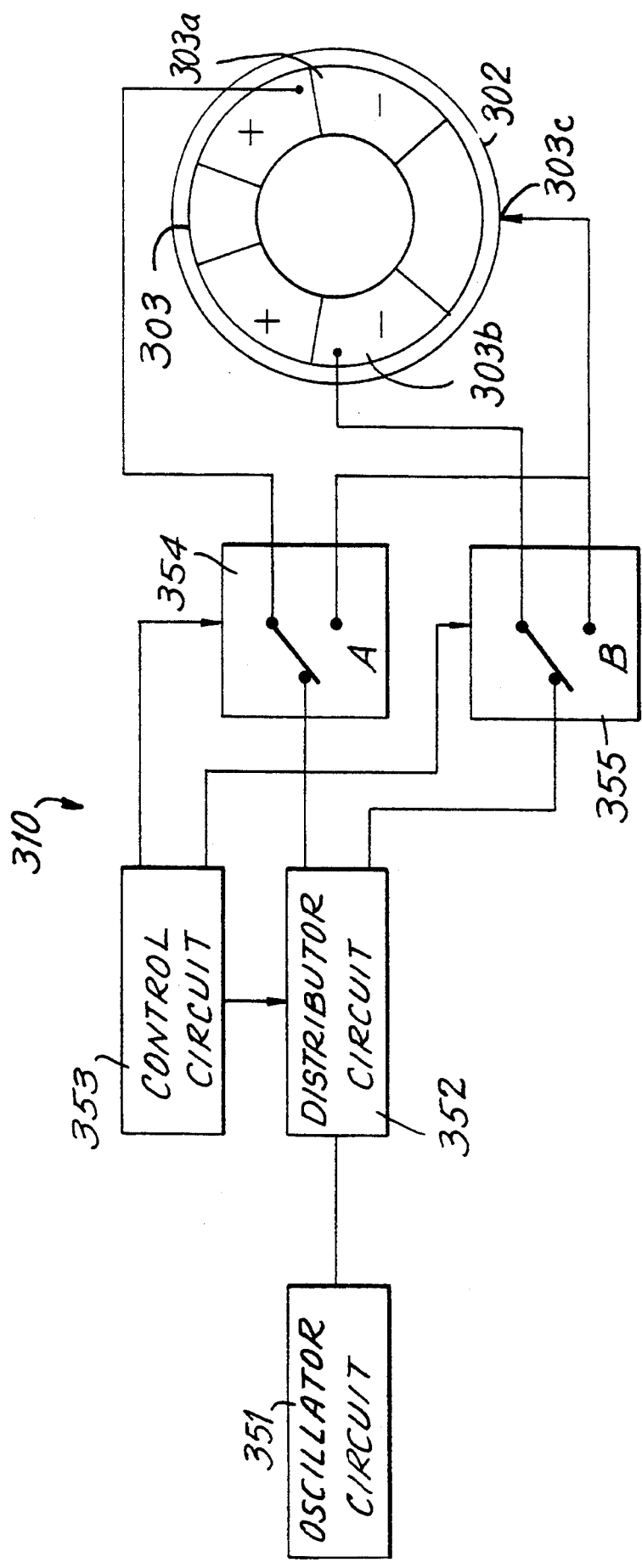
FIG. 19 is a block diagram showing a second embodiment of the vibrator driving circuit constructed in accordance with the present invention.

Reference is now made to FIG. 19 in which a block diagram of another embodiment of a driving circuit for driving the vibrator, generally indicated as 310, constructed in accordance with the invention is provided. A stator 302 has a vibrator 303 attached thereto. Vibrator 303 comprises a plurality of vibrator elements. A first electrode 303a, a second electrode 303b and a common electrode 303c are disposed on vibrator 303. An oscillator circuit 351 outputs a timing pulse to a distributor circuit 352. Distributor circuit 352 receives the input from a control circuit 353 and provides an output to a first switch A 354 and a second switch B 355 in response thereto. Control circuit 353 also provides an output to each of switches A 354 and B 355. Switch A 354 selectively couples electrode 303a to distributor circuit 352 or common electrode 303c. Switch B 355 selectively couples electrode 303b to distributor circuit 352 or common electrode 303c. Stator 302 is vibrated by an excitation voltage applied to electrodes 303a and 303b of two sets of vibrator elements respectively. The electrodes of the vibrating elements apply a voltage of equal potential to portions (denoted by the dashed lines and + and −) of vibrator 303 which are different in polarization direction.

During operation oscillator circuit 351 outputs a timing signal having a frequency substantially equal to the resonance frequency of stator 302. The timing signal is supplied to the electrodes of the vibrator elements through distributor circuit 352. Switching circuit A 354 and B 355 supply the timing signal from the distributor circuit 352 to the electrodes 303a and 303b of the respectively corresponding vibrator elements during one time period and couple either electrode 303a or electrode 303b to common electrode 303c of the vibrator 303 during another time period in response to inputs from control circuit 353 so that the non-driving electrode is coupled to the common electrode. Control circuit 353 controls the operations of the distributor circuit 352 and the switching circuits A 354 and B 355 so as to form the following various states: a state where the signal is supplied to phase A (electrode 303b, electrode 303a is coupled to the common electrode); a state where the signal is supplied to phase B (electrode 303a, electrode 303b is coupled to the common electrode) a state where the signal is supplied to both phases A and B (electrodes 303a, 303b); and a state where no signal is supplied to the phases A and B (both electrodes are coupled to the common electrode). Accordingly, switching circuit A 354 acts independently of switching circuit B 355. The operation of the above described arrangement will be explained below.

Figure 20A:
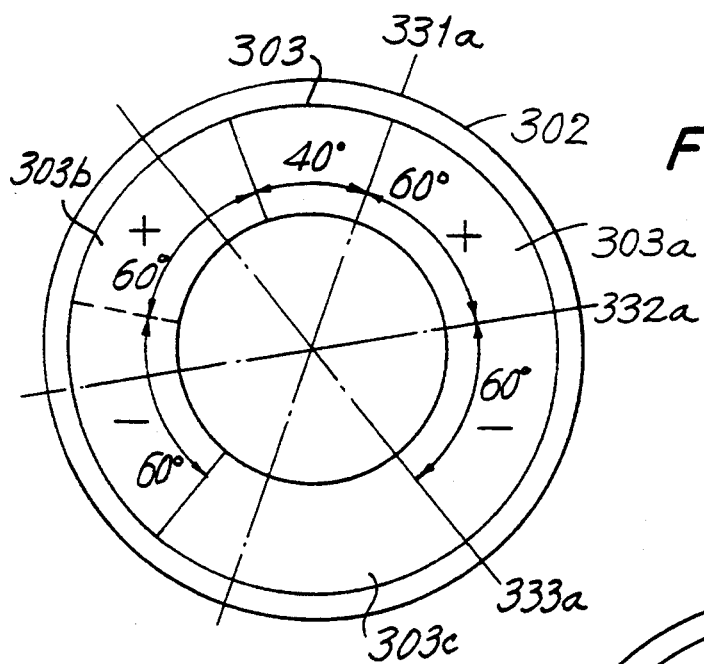
FIGS. 20a, 20b and 20c illustrate schematically the operation of one embodiment of the present invention.
Figure 20C:
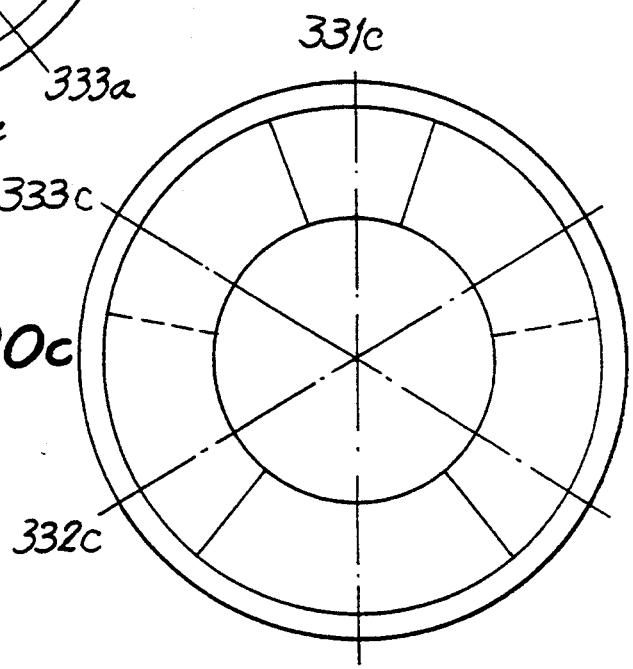
Figure 20B:
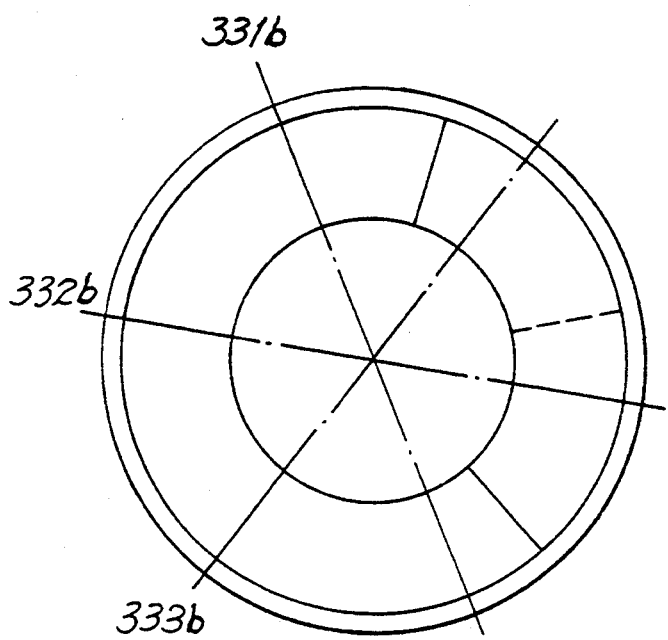

Reference is now made to FIGS. 20a through 20c which illustrate the operation of the driving circuit of FIG. 19. Electrodes 303a and 303b of the vibrator elements formed on vibrator 303 are separated from each other by an angle of 40°. Electrodes 303a and 303b each extend along the circumference of vibrator 303 for 120°. Each electrode 303a, 303b is divided into a positive polarization region (+) extending for 60° and a negative polarization region (−) extending for 60° separated from the positive polarization region by a boundary shown in dashed lines. Since the vibrator 303 is attached to stator 302, if an alternating voltage is applied to either one of electrodes 303a or 303b, stator 302 undergoes flexural vibration in which a node is formed at the position of the boundary between the polarized portions of the excited electrode. At this time, if the frequency of the alternating voltage is at or near the resonance frequency that corresponds to three wavelengths (hereinafter referred to as "3λ") of the flexural vibration, the vibration amplitude is large, and the motor performance improves.

Reference is now made to FIG. 20a which illustrates the operation of stator 302 when electrode 303a is ideally driven. In this case, nodes are formed at the positions 331a, 332 and 333a, i.e. at the outer edges of electrode 303a and the boundary between the positive and negative polarized portions of electrode 303a. However, since stator 302 is formed as a unitary member which also supports electrode 303b, electrode 303b also vibrates at the same time and an electric charge corresponding to the polarization and distortion direction is induced, so that the vibrator 303 itself is distorted by the electric charge. That is the nodes 331a, 332a and 333a are not formed at the desired positions, but rather are shifted relative to the positions shown in FIG. 20a. However, according to the vibrator driving method of the present invention, the non-activated vibrator element electrode is connected to common electrode 303c through respective switching circuits A 354, B 355. Accordingly, a charge drain is formed and no electric charge is accumulated, so that the nodes are formed at the desired positions.

Reference is now made to FIG. 20b illustrating the nodal pattern when electrode 303b is driven. Electrode 303a, which is not driven, is connected to common electrode 303c as descried above, so that nodes 331b, 332b and 333b are formed at the desired positions.

Reference is now made to FIG. 20c the nodal pattern when both electrodes 303a, 303b are driven. When the electrodes 303a and 303b are driven simultaneously a composite vibration mode is produced, and nodes are formed at the positions 331c, 332c and 333c. The nodes are formed at respective positions intermediate the node positions shown in FIG. 20a and those shown in FIG. 20b.

Although in the foregoing arrangement each pair of adjacent nodes are 60° separated from each other in one vibration state, if the vibration states are switched over sequentially between the state shown in FIG. 20a, the state shown in FIG. 20c and the state shown in FIG. 20b, and the state shown in FIG. 20a, the node positions move counterclockwise through 20° at a time. That is, the rotor is driven intermittently. For example, if the node positions are switched each second and the rotational speed of the rotor is reduced to 6°/20° to thereby drive a pointer, the pointer driven by such an ultrasonic step motor can function as a second hand for an analog timepiece that moves through 6° per second.

In this embodiment, if the driving method is suspended after the rotor has moved, the rotor can be held in position by virtue of the friction which exists between the rotor and the stator. Such a structure lowers the consumption of electric power. In addition, since each vibratory element electrode is connected to the common electrode when it is not driven, it is possible to prevent generation of undesired distortion in the vibrator due to accumulation of electric charge. On the other hand, if the electrode is opened to maintain the vibrator at a certain potential, it is possible to prevent deformation due to external force. Accordingly, if the ultrasonic motor is utilized in an application where an external impact may be applied, e.g., in the case of a watch, it is preferable that the vibrator should be maintained at a predetermined potential during a non-drive period to prevent a vibration due to a disturbance or impact and the non-driving electrode should be connected to the common electrode before the initiation of drive to remove unnecessary distortion. Such control can be readily realized by allowing the control circuit 353 to control the switching circuits A 354 and B 355.

Figure 21:
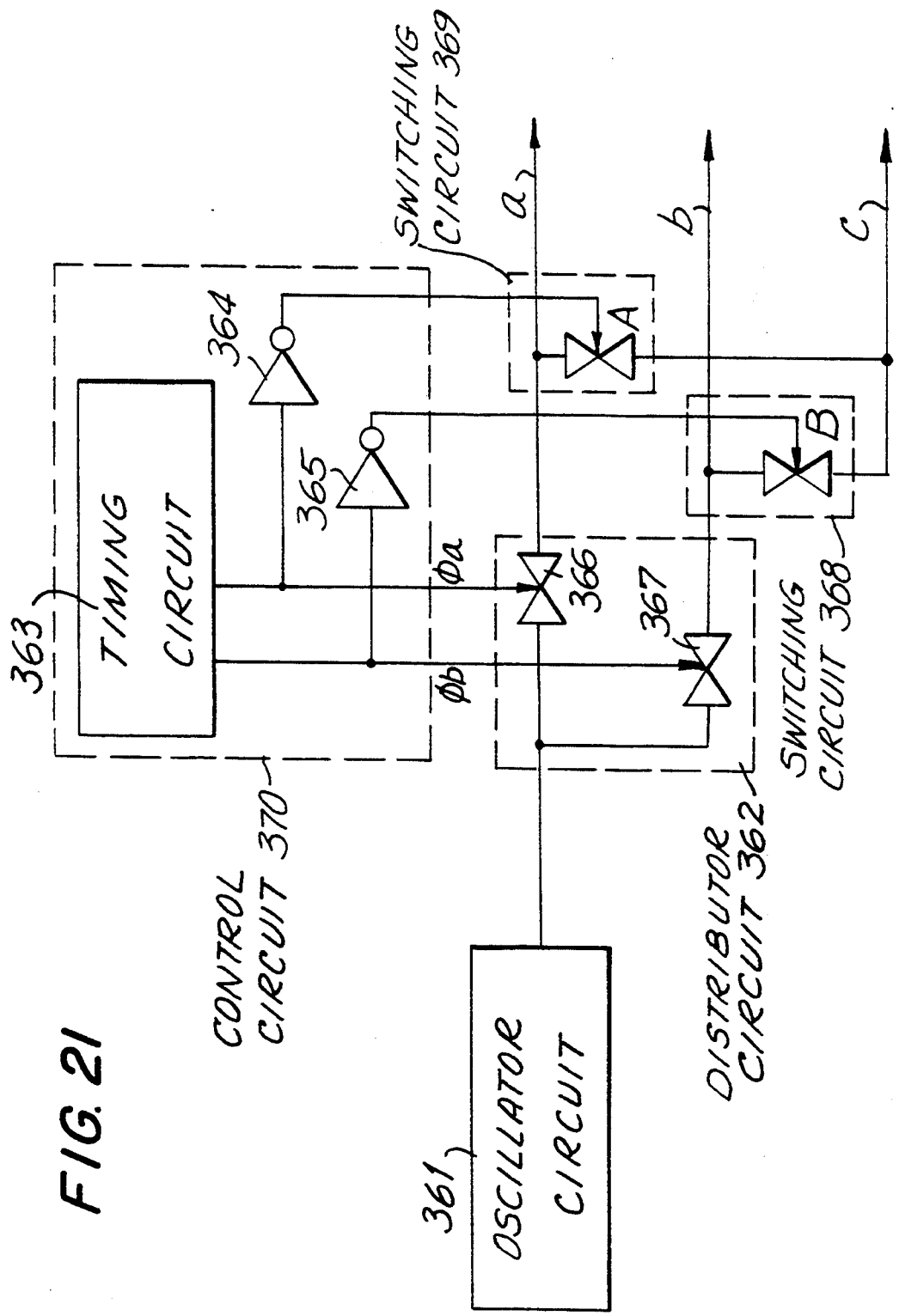
FIG. 21 is a circuit diagram of another embodiment of the vibrator driving circuit constructed in accordance with the present invention.
Figure 22:
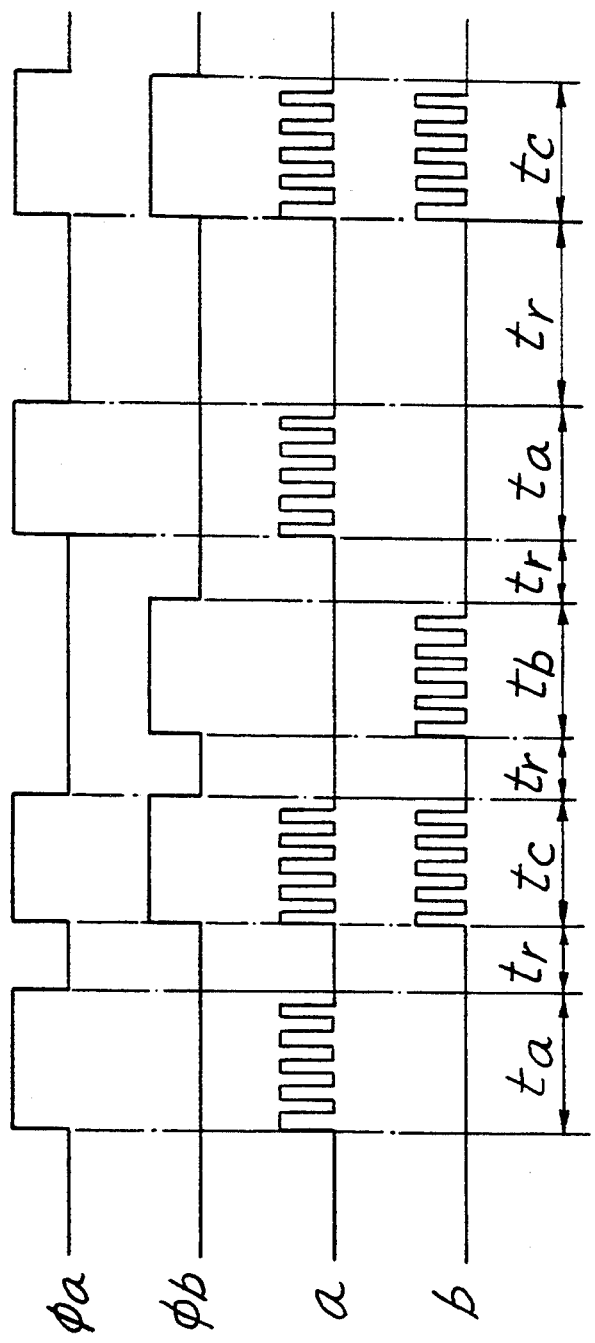
FIG. 22 is a timing chart of the signal waveforms of the circuit shown in FIG. 21.

Reference is now made to FIGS. 21 and 22 in which a circuit diagram and timing chart of another embodiment of the vibrator driving circuit constructed in accordance with the invention is provided. An oscillator circuit 361 provides an input to a distributor circuit 362. A control circuit 370 also provides inputs to distributor circuit 362 which outputs the signals of oscillator circuit 361 in response to the outputs of control circuit 370. Control signal 370 provides outputs to a first analog switching circuit A 369 and a second switching circuit B 368 formed of an analog switch.

Distributor circuit 362 includes a first analog switch 366 and a second analog switch 367. Control circuit 370 includes a timing circuit 363 which outputs a signal $\phi_a$ to first analog switch 366 and a signal $\phi_b$ to second analog switch 367. Control circuit 370 also includes a first inverter 364 and a second inverter 365 which respectively provide the signals $\phi_a$, $\phi_b$ to the analog switches of switching circuits A 369 and B 368, respectively. Signal a is output from switching circuit A 369 and signals b and c are output from switching circuit B 368 to vibrator element electrodes 303a and 303b and a common electrode 303c, respectively. Oscillator circuit 361 outputs a signal to distributor circuit 362. Analog switches 366, 367 of distributor circuit 362 are switched in response to output signals $\phi_a$ and $\phi_b$ from control circuit 370 to supply signals a and b to electrodes 303a and 303b.

As seen in FIG. 22, $t_a$ corresponds to the period for the vibrating state shown in FIG. 20a, $t_b$ corresponds to the period for the vibrating state shown in FIG. 20c, $t_c$ corresponds to the period for the vibrating state shown in FIG. 20b, and $t_r$ corresponds to the period during which the vibrator is not driven. Timing circuit 363 and inverters 364, 365 of control circuit 370 control the timing of signals a and b and the changeover between the periods $t_a$, $t_b$, $t_c$ and $t_r$. When the signals $\phi_a$ and $\phi_b$ are at low level, vibrator element electrodes 303a and 303b are respectively connected to common electrode 303c through inverters 364 and 365 and analog switches of switching circuits A 369, B 369. It should be noted that in this embodiment one example of connecting the electrodes 303a and 303b to the common electrode 303c is shown only for illustrative purposes, and the circuit configuration, the switching timing and so forth are not necessarily limited to this embodiment.

Figure 23:
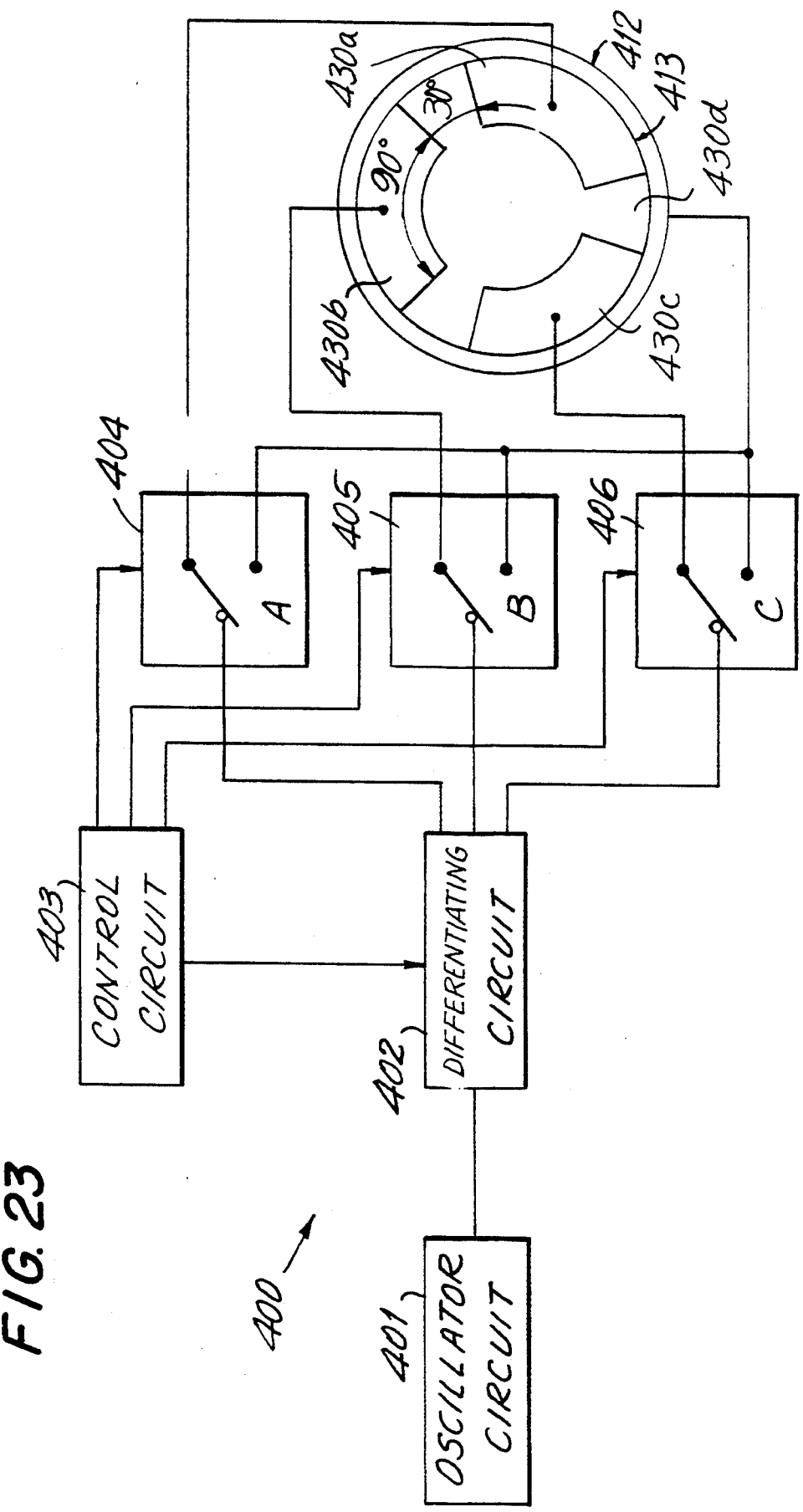
FIG. 23 is a block diagram of another embodiment of the vibrator driving circuit constructed in accordance with the present invention.

Reference is now made to FIG. 23 in which a block diagram of another embodiment of the vibrator driving circuit generally indicated as 400, constructed in accordance with the invention is provided. Driving circuit 400 drives a vibrator 413 mounted on a stator 412. Vibrator 413 has three vibrator element electrodes 430a, 430b and 430c. Each vibrator element electrode extends along the circumference of vibrator 413 through an angle of 90° and each vibrator element electrode is separated from the other by an angle of 30°. A distributor circuit 402 distributes a signal from an oscillator circuit 401 to each of three switching circuits A 404, B 405 and C 406. A control circuit 403 also provides an input to distributor circuit 402 as well as an input to each of switching circuit A 404, B 405 and C 406. Switching circuit A 404 is coupled to vibrator element electrode 430a and selectively switches between distributor circuit 402 and a common electrode 430d in response to the output of control circuit 403. Similarly, switch B 405 is coupled to vibrator element electrode 430b and switches between distributor circuit 402 and common electrode 430d. Switching circuit C 406 is coupled to vibrator element electrode 430c and switches between distributor circuit 402 and common electrode 430d.

Switching circuits A 404, B 405 and C 406 supply the signal from the distributor circuit 402 to the corresponding electrodes 430a, 430b and 430c during a time period determined by control circuit 403 and connect the corresponding electrodes 430a, 430b and 430c to a common electrode 430d during another time period. Distributor circuit 402 and the three switching circuits A 402, B 405 and C 406 are controlled by control circuit 403. The operations of these circuit are similar to those in driving circuit 300. That is, by sequentially exciting the electrodes 430a, 430b and 430c, the node positions of a 2λ vibration mode can be moved through 30° at a time. In addition, when a signal from distributor circuit 402 is supplied to electrode 430a, for example, the electrodes 430b and 430c are connected to common electrode 430d through the switching circuits B 405 and C 406; therefore, voltages which are induced on the electrodes 430b and 430c have no effect on the node positions of the vibration.

The present invention, which has been detailed by way of the foregoing embodiments, is directed to releasing the electric charge induced between the vibrator element electrodes which are driven and those which are not driven to thereby eliminate adverse effects of the electric charge. Accordingly, the configurations of the vibrator and the electrode patterns, the type of vibration mode, the exciting method, and the like are not necessarily limited to the above described embodiments. In addition, the way of releasing the electric charge is not limited to the short-circuiting method described above. It is also possible to release only a predetermined amount of electric charge by using a resistance. Some electrodes may be comprised of a portion which is connected to the common electrode and another portion which is not connected to it. With this arrangement, the node positions of the vibration can be adjusted even more delicately to the desired positions.

Figure 24:
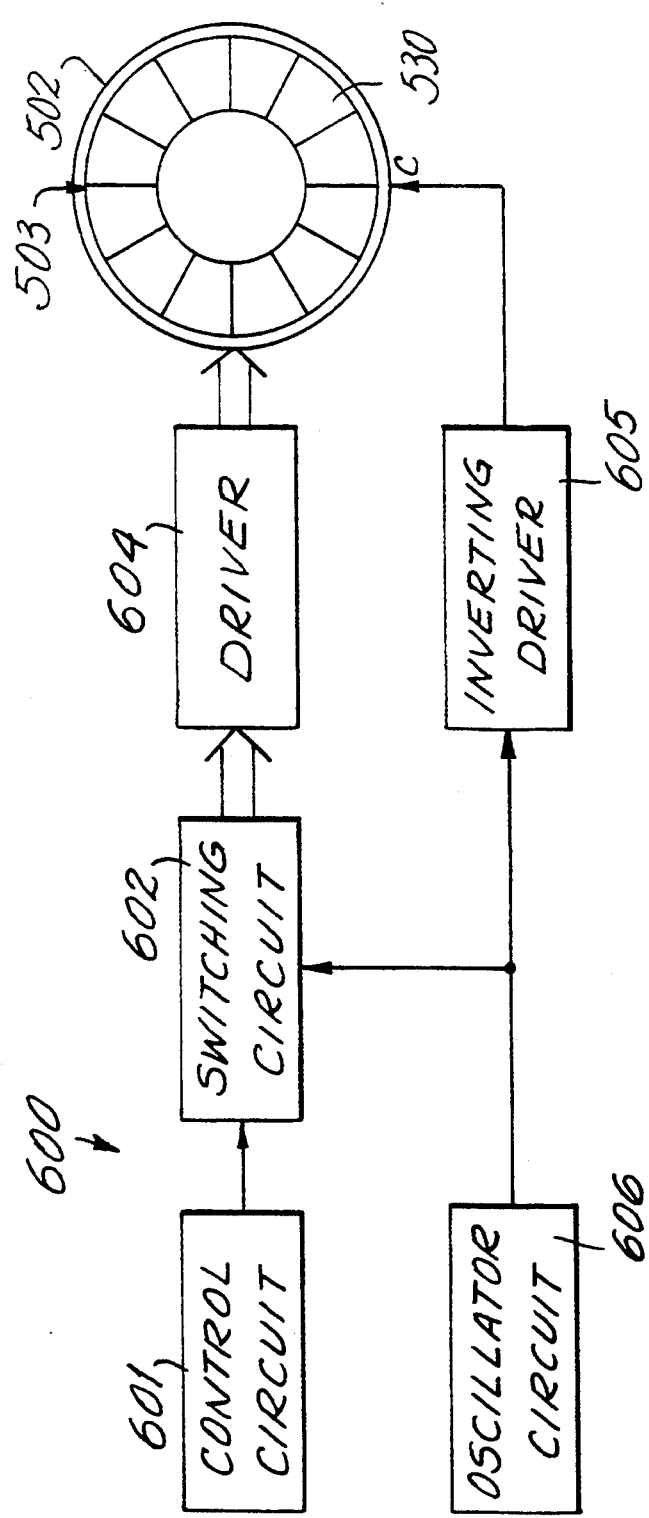
FIG. 24 is a block diagram of another embodiment of the vibrator driving circuit constructed in accordance with the present invention.

Reference is now made to FIG. 24, a block diagram of a vibrator driving circuit generally indicated as 600, constructed in accordance with another embodiment of the invention. Driving circuit 600 drives an ultrasonic step motor having a piezoelectric ceramic vibrator 503 to produce a standing wave of flexural vibration in a stator 502 and in which the node positions of the vibration are sequentially moved. Stator 502 causes a rotor (not shown), which is in frictional contact therewith, to move relative to stator 502 by vibratory displacement. Piezoelectric ceramic vibrator 503 is affixed to stator 502 and includes a plurality of vibrator elements 530 each having a respective independent driving electrode attached thereto. Piezoelectric ceramic vibrator 503 generates flexural vibrations when a voltage is applied thereto. A standing wave vibration mode can be produced by locally driving vibrator elements 530 with an appropriately selected driving frequency. by changing the combination of vibrator elements 530 to be driven, the vibration mode positions can be moved about stator 502.

Driving circuit 600 includes an oscillator circuit 606 outputting an oscillation signal to an inverting driver 605 and switching circuit 602. Switching circuit 602 also receives an input from a control circuit 601 causing switching circuit 602 to provide an output to a driver 604 which in turns provides an output to vibrator element 530. Inverting driver 605 inverts the signal from oscillator circuit 606 and applies the inverted signal to a common electrode indicated as C.

Control circuit 601 controls the timing for moving the node positions of the vibration. An oscillator circuit 606 outputs the oscillating signal having a frequency substantially equal to the resonance frequency of stator 502 having piezoelectric ceramic vibrator 503 attached thereto. Switching circuit 602 distributes the signal from oscillator circuit 606 to amplifiers 621–626 of driver 604 which in turn are coupled to selected vibrator elements 530 to drive the selected vibrator elements in predetermined combinations. A voltage signal which is 180° out of phase with respect to the voltage applied to vibrator elements 530 is applied through inverting driver 605 to common electrode C which is counter to driving electrodes associated with each vibrator element 530.

Figure 25:
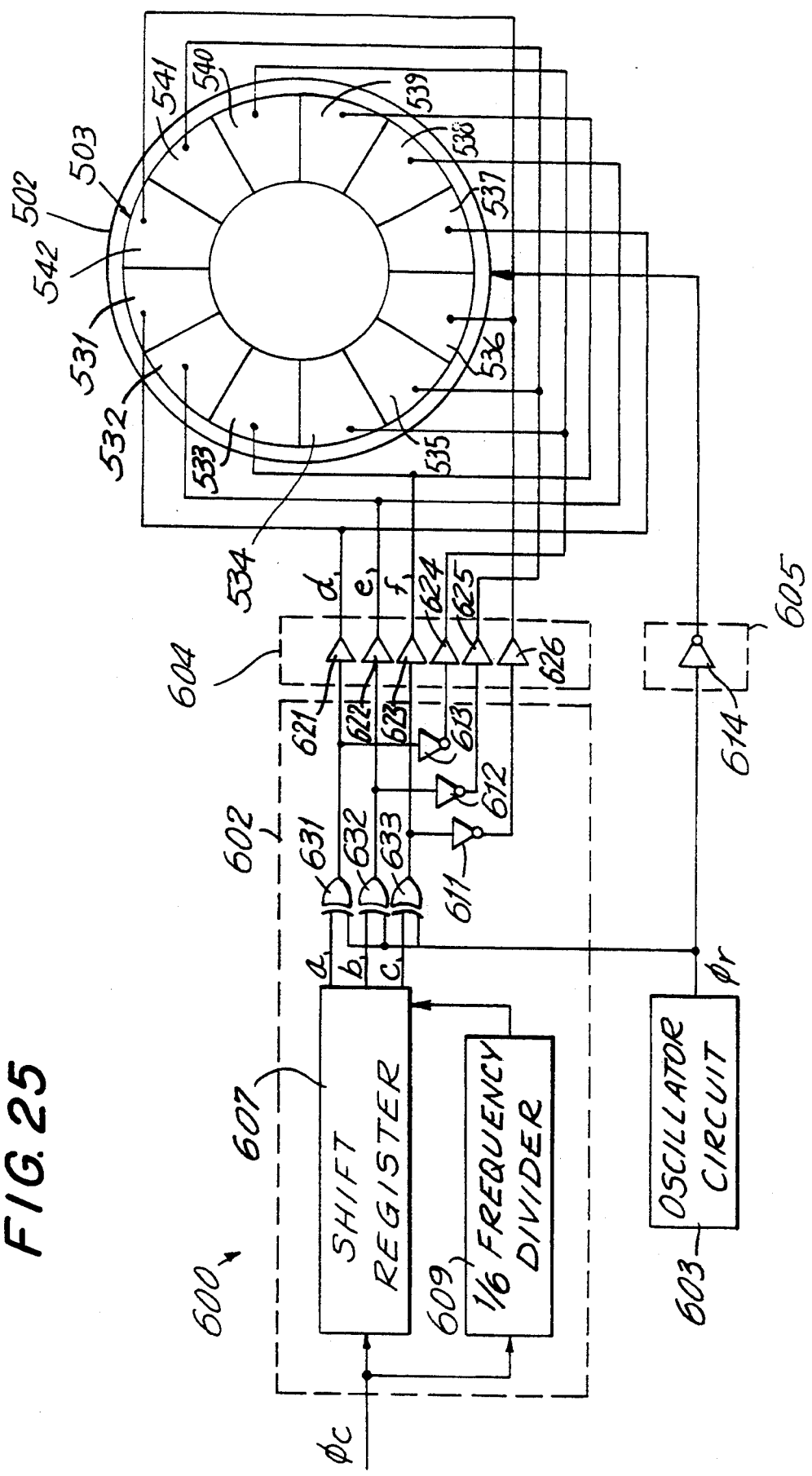
FIG. 25 is a circuit diagram showing another embodiment of the vibrator driving circuit constructed in accordance with the present invention.
Figure 26:
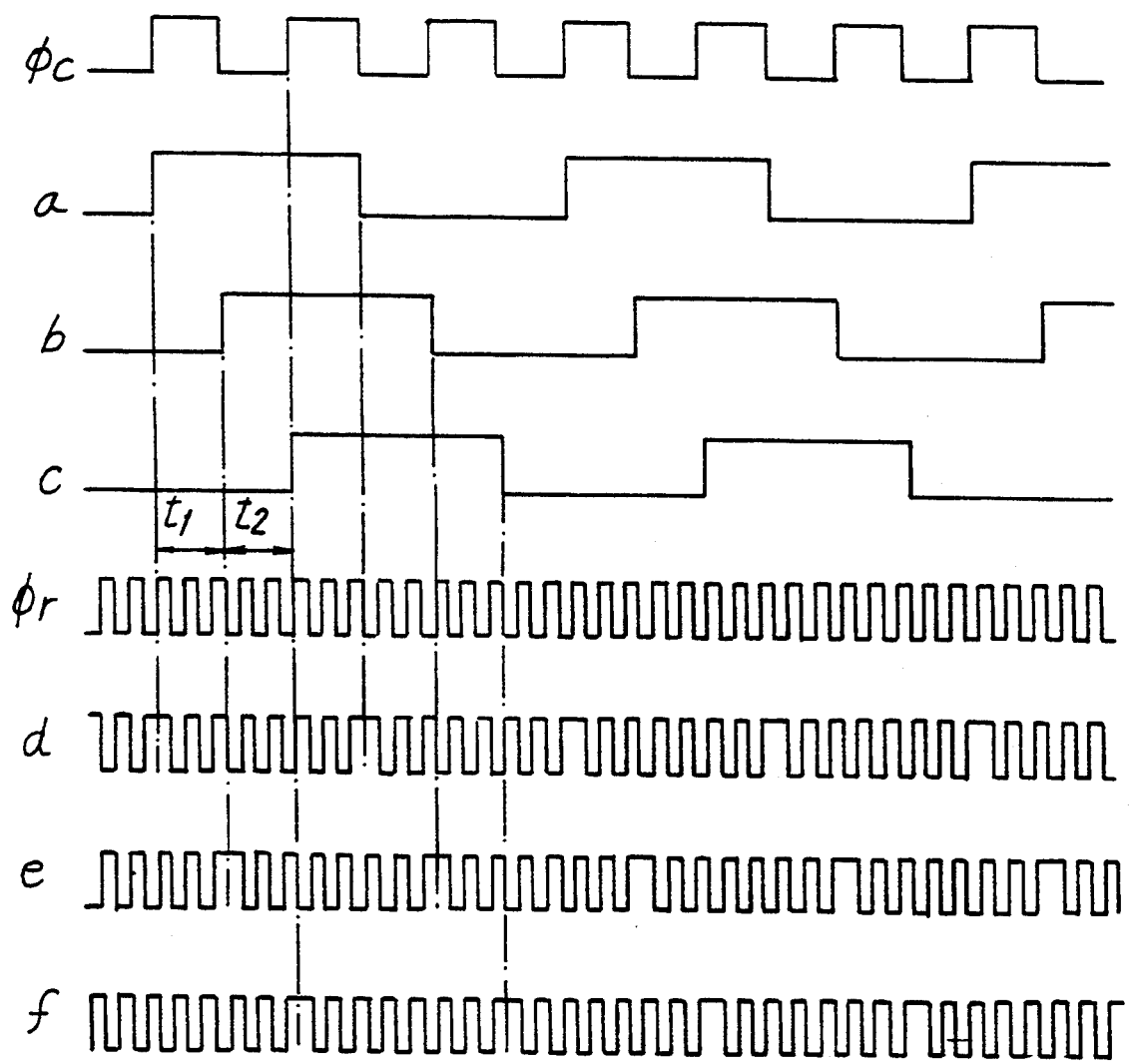
FIG. 26 is a timing chart for the signal waveforms of the circuit shown in FIG. 25.

Reference is now made to FIGS. 25 and 26 wherein a circuit diagram and timing chart for explaining the operation of driving circuit 600 in detail are provided. In this embodiment, a vibration mode of 2λ (λ represents wavelength) is generated on stator 502. Two node positions are moved through 360° in twelve discrete steps of 30°. Piezoelectric ceramic vibrator 503 has twelve vibrator elements 530 and their associated driving electrodes 531 through 542 which are deformable independently of each other. Switching circuit 602 includes a shift register 607 which receives a control signal $\phi_c$ from control circuit 601. Shift register 607 also receives a divided signal $\phi_c$ from 1/6 frequency divider 609 in response thereto and outputs three control signals a, b, c. Switching circuit 602 is also provided with an array of exclusive OR gates 631-633 which each receive signal $\phi_r$ produced by oscillator circuit 603 as well as one of control signals a, b, c, respectively. The output of exclusive OR gates 631-633 is directly output to driver 604. Switching circuit 602 also includes inverter 611, 612, 613 coupled to the output of exclusive OR gates 631-633 which output an inverted output of exclusive OR gates 631-633 to driver 604.

Driver 604 includes an array of amplifiers 621 through 626. Each of amplifiers 621 through 626 is coupled to two vibrator elements 530, the vibrator element pair being in axial symmetry with each other. Accordingly, the signal d is output by amplifier 621 is applied to vibrator elements 531, 537. Output signal e of amplifier 622 is provided to vibrator elements 532, 538 and signal f is output by amplifier 623 to vibrator elements 533 and 539. Amplifiers 624 through 626 provide the inverted signals $\bar{d}$, $\bar{e}$, $\bar{f}$ respectively to a vibrator element pair in axial symmetry with each other. Amplifier 624 provides an output to vibrator elements 534, 540. Amplifier 624 provides an output to vibrator element pair 535, 541 and amplifier 626 provides an output to vibrator element pair 536, 542. Inverting driver 605 inverts $\phi_r$ and applies $\phi_r$ to common electrode C.

In this embodiment, the direction of polarization may be uniform, and the common electrode is disposed over the whole area of the reverse side of piezoelectric ceramic vibrator 503. By driving three adjacent vibrator elements and three vibrator elements which are in diagonally opposing relation to each other (axial symmetry) and in phase with each other, a 2λ vibration mode can be generated. If the combination of three vibratory element is shifted through an angle (30°) corresponding to the width of one vibrator element, the node positions also move through 30°.

In response to timing signal $\phi_c$, shift register 607 outputs signals a, b and c which are out of phase with each other. Driving signals d, e and f are formed through exclusive OR gates 631-633, together with inverted signals which are formed through inverters 611, 612 and 613 in response to $\phi_r$. The voltages are applied to vibrator elements 531 to 542 through a driver 604 comprising amplifiers 621 to 626. Simultaneously, a voltage which is in phase opposition with respect to the signal $\phi_r$ is produced by inverting driver 605 and is applied to common electrode C on the piezoelectric ceramic 503. The signals d, e and f are inverted in phase at the respective occurrence of the signals a, b and c so as to be either in-phase or in phase opposition with respect to the signal $\phi_r$.

When the signals d, e and f are in phase opposition, the voltages are applied alternately to the driving electrode side and the common electrode side; therefore, it is possible to obtain an advantageous effect equivalent to a voltage which is double the driving voltage being applied to vibratory elements 530. When the signals d, e and f are in-phase, the potentials are equal to each other; therefore, the vibratory elements are given no substantially potential difference and not driven.

During the period $t_1$ (FIG. 26), vibrator elements 531, 532, 533, 537, 538 and 539 are driven, and during the period $t_2$ the vibrator elements 532, 533, 534, 538, 539 and 540 are driven. Thereafter, the positions of vibrator elements to be driven are sequentially shifted. In consequence, the node positions move through an angle (30°) corresponding to one vibrator element, causing the rotor to be driven intermittently. It should be noted that, when the in-phase voltage is applied to the driving electrode side and the common electrode side, the electric charge accumulated on the vibrator elements due to the vibration can be released, and therefore it is possible to prevent the occurrence of adverse effects of unnecessary deformation due to the electric charge.

Figure 27:
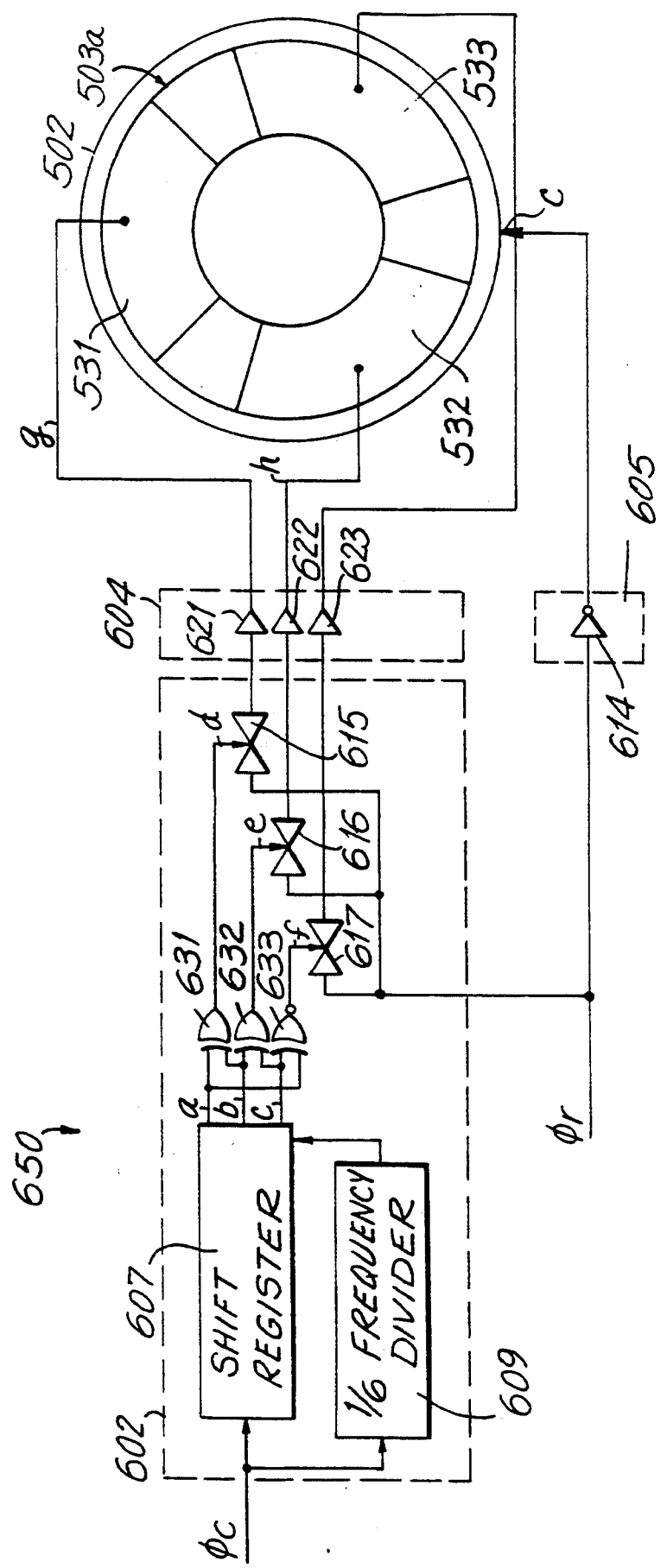
FIG. 27 is a circuit diagram showing another embodiment of the vibrator driving circuit constructed in accordance with the present invention.
Figure 28:
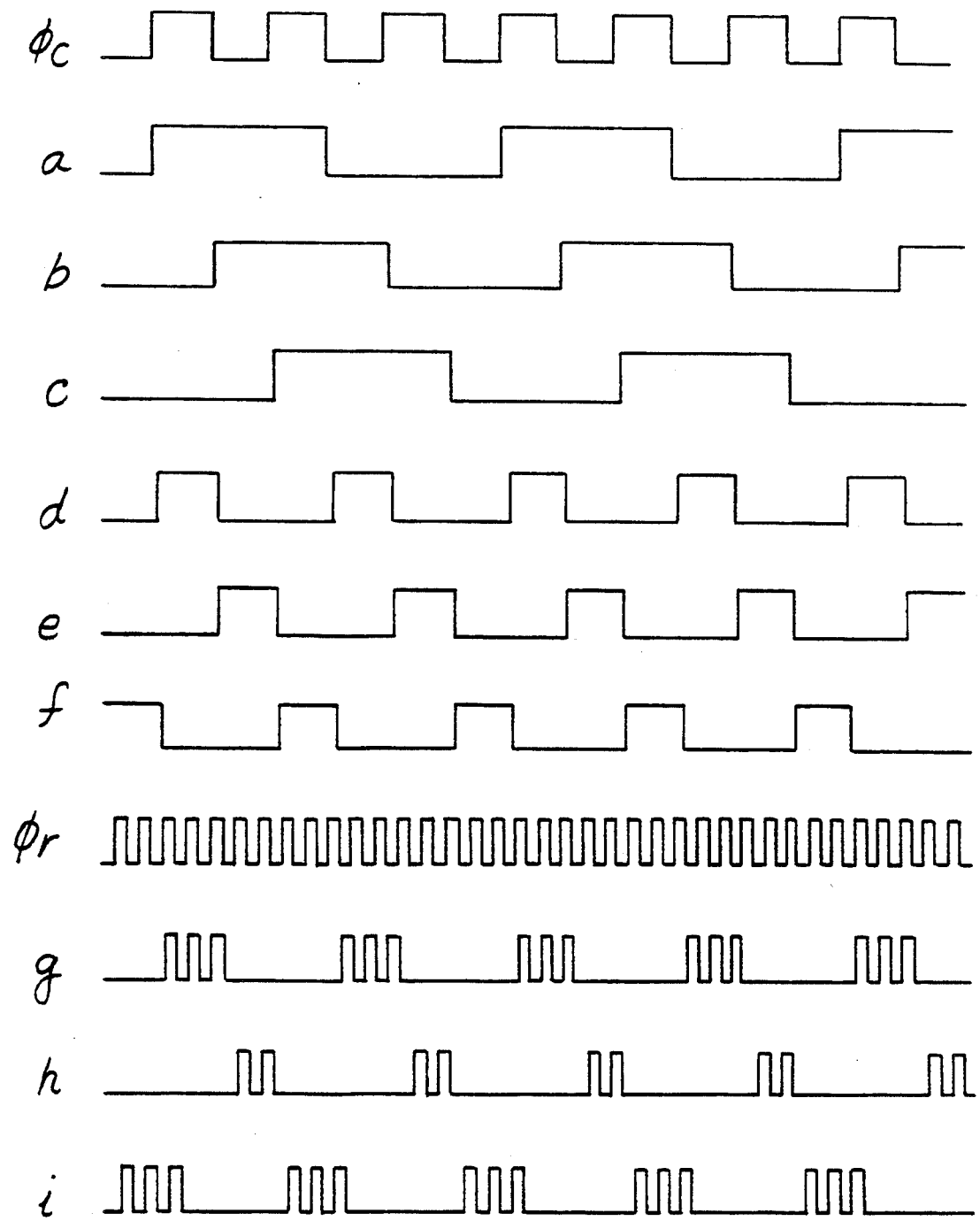
FIG. 28 is a timing chart for the signal waveforms of the circuit shown in FIG. 27.

Reference is now made to FIGS. 27 and 28 showing a circuit and timing charts for a driving circuit, generally indicated as 650, constructed in accordance with another embodiment of the invention. Like numerals are utilized for like parts, the difference between driving circuit 600 and 650 being the replacement of inverters 611 through 613 with switches 615, 616, the number of amplifiers utilized by driver circuit 604 and the number of vibrator elements.

Piezoelectric ceramic vibrator 503a has, by way of example, three vibrator elements with respective driving electrodes 531, 532 and 533, which are disposed at equally divided positions about piezoelectric vibrator 503a, i.e. 120° offset from each other. In this arrangement, when the vibrator elements are sequentially driven at a frequency in the vicinity of the resonance frequency, corresponding to 2λ, the node positions move through 120° at a time. Since the relative angle of two nodes is 90° in this case, the angle through which the nodes move is equivalent to 30°. Shift register 607 of switching circuit 602 provides outputs signals a, b, c to exclusive OR gates 631, 632 and exclusive NOR gate 633, respectively. The respective outputs d, e, f of exclusive OR gates 631, 632 and exclusive NOR gates 633 are input to switches 615, 616, 617, respectively. Each of switches 615 through 617 also receives the signal $\phi_r$ generated by the oscillator circuit 603 as a second input. Switches 615, 617 output $\phi_r$ in response to signals d, e, f to driver 604. Driver 604 includes a plurality of amplifiers 621-623. Amplifier 621 receives the output of switch 615, amplifier 622 receives the output of switch 616 and amplifier 623 receives the output of switch 617.

Amplifier 621 provides an output signal g to a driving electrode 531. Amplifier 622 provides an output signal h to driving electrode 532 and amplifier 623 provides an output to driving electrode 533.

During operation shift register 607 outputs signals a, b and c in response to timing signal $\phi_c$ and an output from 1/6 frequency differential circuit 609. Signals d, e and f are output by exclusive OR gates 631 and 632 and exclusive NOR gate 633 in response to signals a, b, c. Switches 615, 616 and 617 output signals g, h and i to driving electrodes 531, 532, 533 through driver 604 in response to $\phi_r$ and a, b, c. Simultaneously, a voltage signal which is in phase opposition with respect to the signal $\phi_r$ is applied to the common electrode C on the piezoelectric ceramic vibrator 503a through inverting driver 605. Accordingly, an alternating voltage is applied to vibrator elements 531 through 533.

Figure 29:
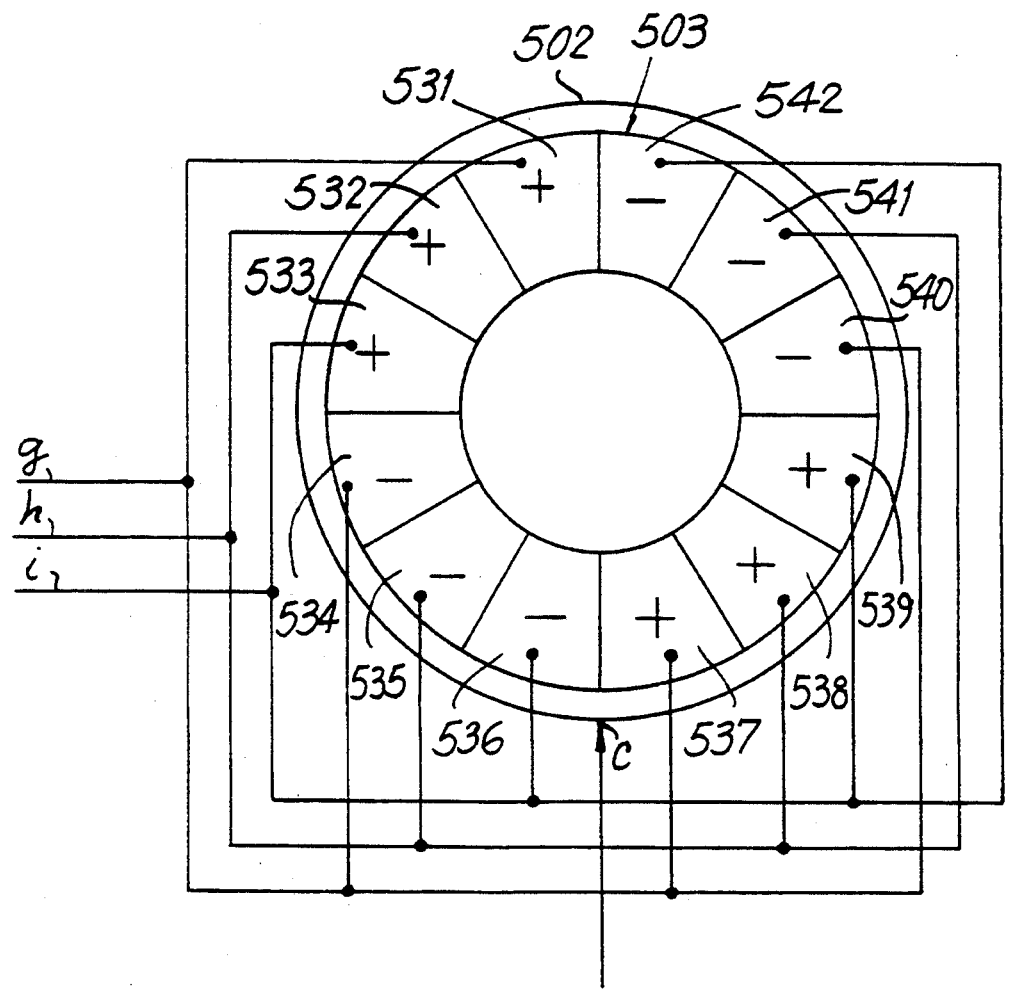
FIG. 29 is a bottom plan view of vibratory elements and driving electrodes arranged in accordance with another embodiment of the invention.

Reference is now made to FIG. 29 in which a plan view of a stator constructed in accordance with drive circuit 600 driven by drive circuit 650 is provided. The directions of polarization are represented by the signs + and −. Driving electrodes 531, 534, 537 and 540 are driven by the signal g (FIG. 28), driving electrodes 532, 535, 538 and 541 by the signal h, and driving electrodes 533, 536, 539 and 542 are driven by signal i, thereby enabling the 2λ vibration mode to be shifted through 30° at a time in the same way as discussed above in connection with drive circuit 650. In this embodiment, since it is possible to drive only portions which correspond to the loops or antinodes of the vibration at all times, the vibration amplitude can be increased.

Figure 30:
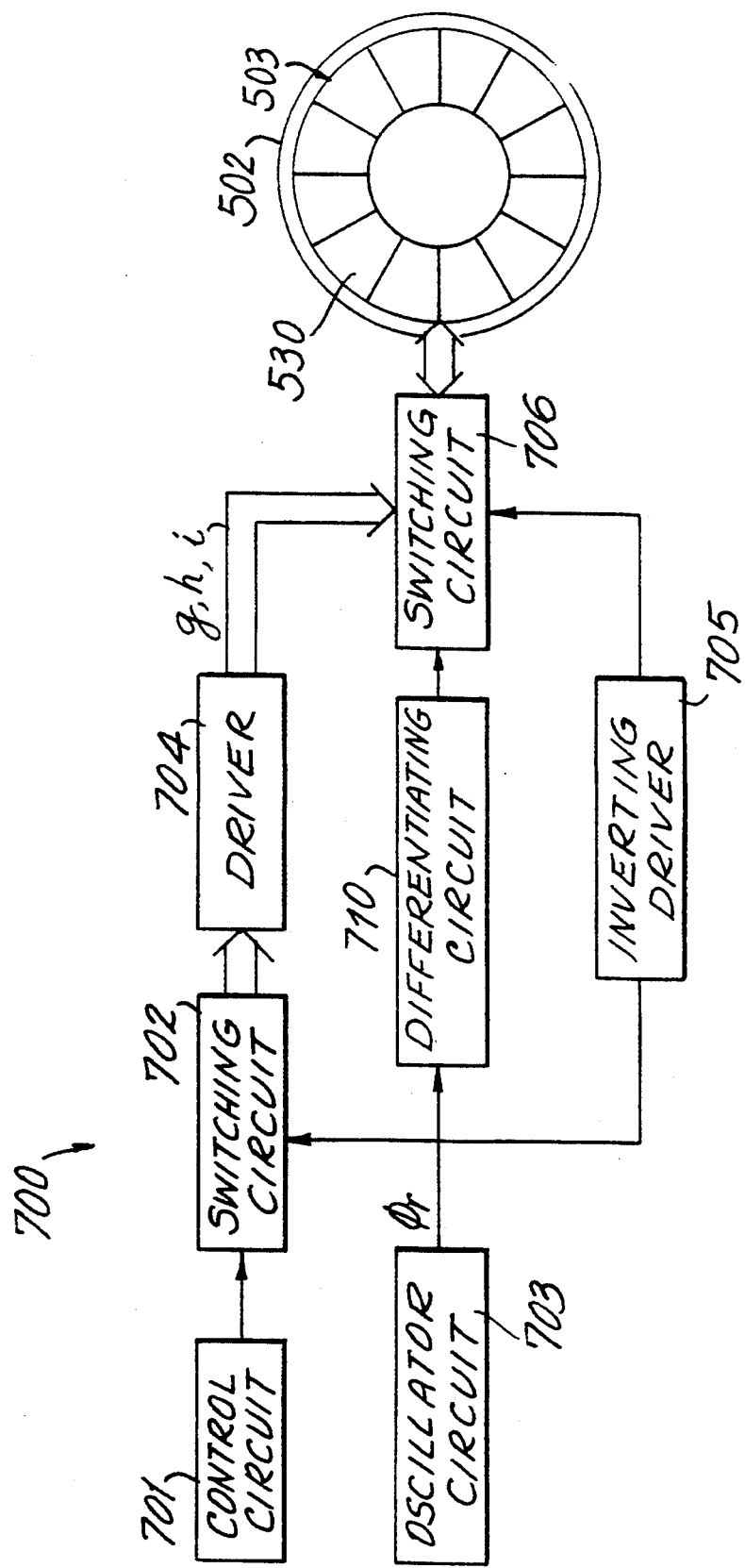
FIG. 30 is a block diagram showing another embodiment of a vibrator driving circuit constructed in accordance with the present invention.

Reference is now made to FIG. 30 in which a block diagram of a vibrator driving circuit, generally indicated as 700, constructed in accordance with another embodiment of the invention is provided. Driving circuit 700 includes an oscillator circuit 703 which provides a signal $\phi_r$ to a differentiating circuit 710 which in turns provides an output signal j to a switching circuit 706. A control circuit 701 provides an output to a switching circuit 702. Switching circuit 702 also receives $\phi_r$ as an input and in response thereto outputs a signal to driver 704 which outputs signals g, h, i to switching circuit 706. Switching circuit 706 provides driving signals to vibrator elements 530 of vibrator 503 mounted on a stator 502. Stator 502 is formed of an elastic member.

Signal $\phi_r$ produced by oscillator circuit 703, oscillates at a frequency substantially equal to the resonance of vibrator 503. Switching circuit 702 switches between portions of signal $\phi_r$ in response to a timing signal from control circuit 701. $\phi_r$ output by switching circuit 702 is amplified by driver 704 to deliver driving signals g, h and i (FIG. 28). Simultaneously inverting driver 705 inverts and amplifies signal $\phi_r$. Differentiating circuit 710 forms a differential waveform j in response to signal $\phi_r$. Switching circuit 706 gates signals g, h and i and periodically forms a short circuit with common electrode C to drive driving electrodes 530 at time intervals determined in response to differential waveform j.

Figure 31:
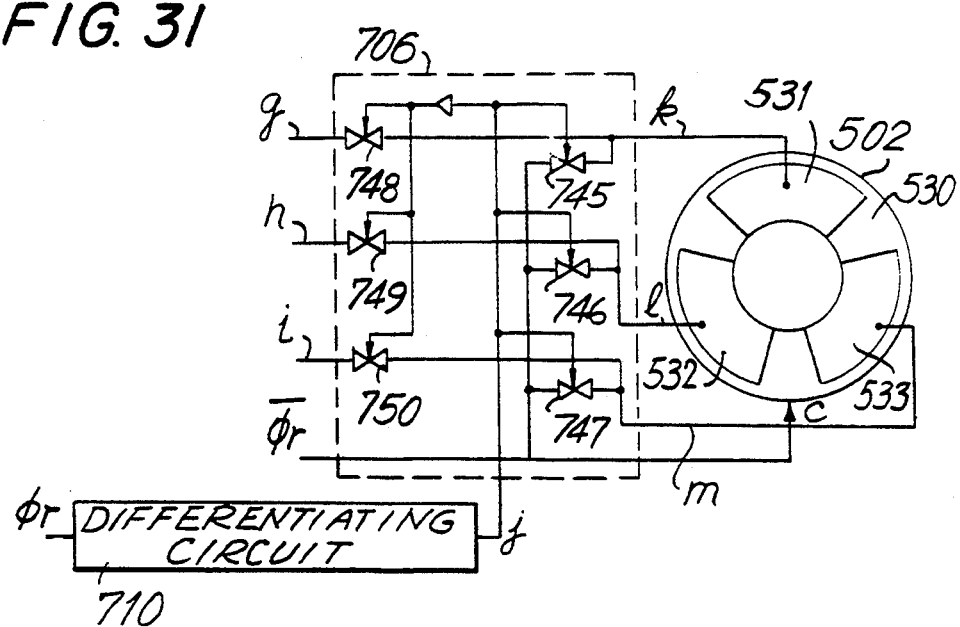
FIG. 31 is a circuit diagram of one embodiment of the driving circuit showing the combination of a differentiating circuit and a switching circuit.
Figure 32:
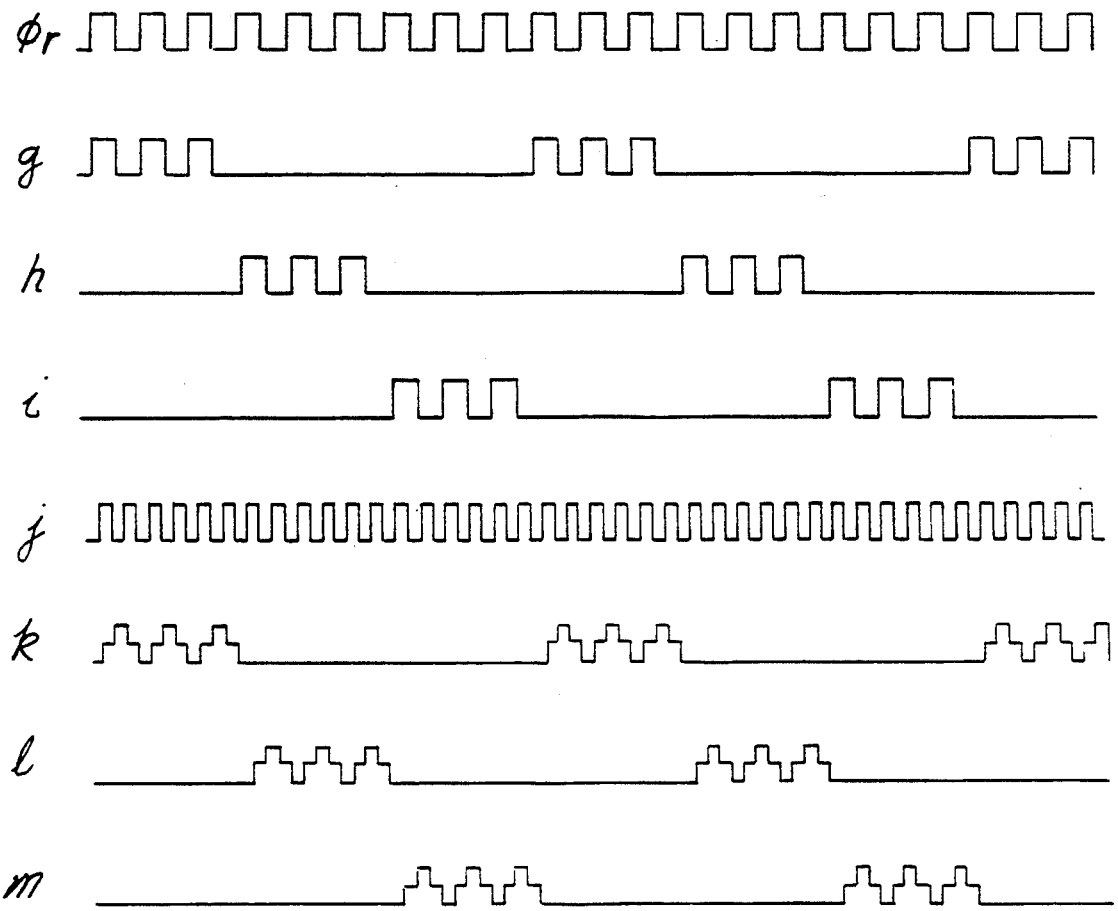
FIG. 32 is a timing chart for the signal waveforms of the circuit shown in FIG. 31.

Reference is now made to FIGS. 31 and 32 wherein a circuit diagram and timing chart for the operation of switching circuit 706 is provided. Switching circuit 706 includes a first switch 748 coupled between the g signal output of driver 704 and a driving electrode 531 of vibrator 530, a second switch 749 coupled between the h signal output and vibrator electrode 532, and a third switch 750 coupled between i signal output, and driving electrode 537. Each of switches 748, 749 and 750 is gated by signal j produced by differentiating circuit 710 through a diode 704. Signal j also gates switch 745 coupled between the input $\phi_r$ and driving electrode 531. Similarly, switch 747 is gated by signal j and is coupled between $\phi_r$ and electrode 532, while switch 747 is gated by signal j and provides signal $\phi_r$ to driving electrode 537. Each of switches 745, 746 and 747 are also coupled to common electrode C.

Differentiating circuit 710 generates a pulse j with a relatively short width in response to the rise and fall of the waveform $\phi$. Switches 745, 746 and 747 are switched on in coincidence with pulse j to connect driving electrodes 531, 532 and 533 and the common electrode C to thereby release the accumulated electric charge. Simultaneously, switches 648, 649 and 650 are switched off in response to signal $\phi_r$ through an inverter 644 to cut off the signals g, h and i. Accordingly, a voltage which is double, $V_{DD}$, is applied to the vibratory elements at maximum.

During the period when driving electrodes 531, 532 and 533 and the common electrode C are being shorted, the exchange of electric charges is made within piezoelectric ceramic vibrator 530 and no voltage is supplied from the DC power supply.

Accordingly, the consumption of current can be lowered. The waveforms k, l and m conceptually show the shorted states as intermediate potentials.

It should be noted that the present invention is directed to releasing the accumulated electric charge of the vibrator and, therefore, the structure for releasing electric charge is not limited to an embodiment in which the driving electrodes and the common electrode are shorted, as in the foregoing embodiments. For example, the driving electrodes may be shorted to each other either simultaneously or individually. There is no other particular restriction on the configuration of the electrodes and the combination of electrodes to be shorted.

The vibrator driving circuit and method of the present invention is characterized by applying phase voltages in phase opposition to the driving electrodes and the common electrode. Therefore, the vibration mode, electrode patterns, driving circuit and so forth are not limited to those described above. Although the present invention has been detailed above by way of embodiments in which the invention is applied to an ultrasonic motor that employs a piezoelectric ceramic, it should be noted that the described embodiments are not inclusive.

As has been detailed above by way of several embodiments, the ultrasonic step motor of the present invention makes it possible to specify the direction of a vibration mode by providing the rotor with mass and rigidity distributions or attaching a vibrator to the rotor. In addition, the rotor can be driven stepwise by combining standing wave vibrations when driving the stator and properly switching between a travelling wave vibration and the standing wave vibration. Accordingly, it is possible to obtain a desired amount of rotation in sequence without the need for feedback control or the like. Since the stator is provided with relief portions at positions corresponding to the loops of the vibration mode, it is possible to prevent interference between the flexural vibrations when a standing wave is produced, and hence possible to stabilize the vibration mode.

In the arrangement of the vibrating sections of the piezoelectric ceramic in the prior art, the areas of the phases A and B are different from each other; therefore, when each phase is driven singly, differences are produced between the two phases in the amplitude and resonance frequency of the vibrating wave, and the node positions of the composite wave are not coincident with the expected positions. According to the present invention, however, the phases A and B are in axial symmetry and equal to each other in area. It is therefore, possible to eliminate the above described problems of the prior art.

In another conventional arrangement of polarized sections of the piezoelectric ceramic vibrator, vibrating sections which are either larger or smaller than ½ of the wavelength of the vibrating wave are formed at both extremities, respectively, of each phase in order to maximize the driving area. In the conventional arrangement, however, the polarized sections at the two extremities of each phase are different in area from each other, so that each phase is out of balance. Accordingly, when each phase is driven singly, the node position of the vibratory wave in each phase is not coincident with the boundary between the vibrating sections. However, according to the arrangement of vibrating sections of the present invention, polarized sections which are either larger or smaller than ½ of the wavelength of the vibrating wave are disposed with equal area at the two extremities of each phase. Accordingly, each phase can be formed in a well-balanced condition, so that a node of the vibrating wave is formed at the boundary between the vibrating sections, thus solving the above described problems of the prior art, In addition, since in the present invention the node position of the standing wave produced by driving each phase is coincident with the boundary between the vibrating sections and the amplitudes of the standing waves produced by the two phases are equal to each other, the node positions of a composite wave of these standing waves are formed at the expected positions. Further, since the driving areas increase equally, a stable driving condition is obtained and it is possible to realize an ultrasonic motor of high efficiency.

In the embodiment shown in FIG. 18, driving can be minimized without displacing the expected node positions of the vibratory wave, and it is therefore possible to realize an ultrasonic motor of low power consumption.

According to the vibrator driving method of the present invention, the electrodes of vibrator elements to which no voltage is applied are connected to the common electrode, whereby the node positions of the vibration mode can be formed at the desired positions. Accordingly, it is possible to improve the positioning accuracy in a stepwise drive of the motor. In an ultrasonic motor of the type which is continuously rotated forward or backward, the speed of forward rotation and that of backward rotation can be equalized with each other. In addition, the node positions can be adjusted even more delicately by releasing the accumulated electric charge.

Further, since a voltage which is double the power supply voltage can be applied to the vibrator by applying phase opposition voltages to the driving electrodes and the common electrode, the motor can be driven at a relatively low power supply voltage. Since the polarization of the piezoelectric ceramic is effected in only one direction, the production cost can be lowered. It is also possible to obtain a large vibration amplitude by exciting vibrator elements at positions corresponding to the loops of the vibration mode. In addition, it is possible to halve the current supplied from the power supply by shorting the electric charge accumulated on the piezoelectric ceramic.

It will thus be seen that the objects set forth above, among those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An ultrasonic step motor comprising:

a first member, including an elastic member, having portions selectively displaceable in a first direction;

vibrator means mounted on a first member including a plurality of vibrator elements, said vibrator elements being operatively coupled to said selectively displaceable portions of said first member for displacing said displaceable portions of said first member in said first direction;

a second member, in frictional contact with said first member, said second member being movable in a second direction substantially orthogonal to said first direction;

driving means for outputting a voltage to a respective vibrator element causing said vibrator element to displace an associated displaceable portion of said elastic member causing said elastic member to induce a vibration mode in said first member in a predetermined direction to selectively move said second member in said second direction, said vibrator elements being divided into at lest a first set and a second set, said driving means selectively outputting a voltage to said first set of vibrator elements simultaneously with each other forming a first driving phase and said second set of vibrator elements simultaneously with each other forming a second driving phase, said first member having an axis, said vibrator elements of said first driving phase being disposed on said vibrator means in axial symmetry with said vibrator elements of said second driving phase;

said vibrator means inducing a standing vibrating wave on said elastic member, said vibrating wave forming at least two nodes and a loop on said elastic member, and said set of vibrator elements receiving said voltage input being axially symmetric with a position of the loop formed in the vibrating wave produced on the elastic member within the range of a half wavelength of the vibrating wave.

2. The ultrasonic step motor of claim 1, further comprising a first set of electrodes affixed to a respective one of said first set of vibrator elements, at least a second set of electrodes coupled to a respective one of said second set of vibrator elements, and a common electrode disposed on said elastic member, said driving means providing a voltage to at least one of said first set of electrodes or said second set of electrodes to generate a vibration of a standing wave on said elastic member, said node position of said vibration being sequentially moved in response to outputs from said driving means, said driving means applying a voltage to said common electrode which is in phase opposition to the voltage applied to either one of said first set of electrodes or said second set of electrodes.

3. An ultrasonic step motor comprising an elastic member having portions selectively displaceable in a first direction, vibrator means mounted on said elastic member shaped as a disk and operatively coupled to said selectively displaceable portion for displacing said portions of said elastic member, said vibrator means including a plurality of vibrator elements, a plurality of driving electrodes mounted on a respective one of said plurality of vibrator elements;

driving means for providing an output voltage to a predetermined combination of the driving electrodes, said combination of driving electrodes causing said vibrator means to selectively displace portions of said elastic member in response to said voltage;

a second member movable in a second direction substantially orthogonal to said first direction, said elastic member inducing a vibration mode in said first member in a predetermined direction to selectively move said second member in said second direction; and a common electrode disposed on said elastic member, said driving means outputting a first voltage to said driving electrode members to displace said displaceable portion of said elastic member as a standing wave and applying a second voltage in phase opposition to said first voltage to said common electrode.

4. The ultrasonic step motor of claim 3, further comprising switching means for selectively coupling said common electrode to said driving electrodes to discharge an accumulated charge of said vibrator means.

5. The ultrasonic step motor of claim 3, wherein said driving means causes said vibrator means to generate a plurality of distinct vibration modes, and not applying a voltage to at least one of said driving electrodes during a predetermined time period and coupling said at least one driving electrode to said common electrode during said predetermined time period.

6. An ultrasonic step motor comprising an elastic member having portions selectively displaceable in a first direction, vibrator means mounted on said elastic member shaped as a disk and operatively coupled to said selectively displaceable portion for displacing said portions of said elastic member, said vibrator means including a plurality of vibrator elements, a plurality of driving electrodes mounted on a respective one of said plurality of vibrator elements;

driving means for providing an output voltage to a predetermined combination of the driving electrodes, said combination of driving electrodes causing said vibrator means to selectively displace portions of said elastic member in response to said voltage;

a second member movable in a second direction substantially orthogonal to said first direction, said elastic member inducing a vibration mode in said first member in a predetermined direction to selectively move said second member in said second direction; and a common electrode disposed on said elastic member, said driving means outputting a first voltage to said driving electrode members to displace said displaceable portion of said elastic member as a standing wave; and switching means for selectively coupling said common electrode to said driving electrodes to discharge an accumulated charge of said vibrator means.

7. A method for driving an ultrasonic step motor having an elastic member having portions selectively displaceable in a first direction, vibrator means mounted on the elastic member and operatively coupled to said selectively displaceable portions for displacing said portions of said first elastic stator, the vibrator means including a plurality of vibrator elements, plurality of electrodes operatively coupled to a respective vibrator element, a driving circuit for applying a voltage to said vibrator means causing said vibrator to displace said portion of said first elastic member, a common electrode disposed on said elastic member, the method, comprising the steps of:

applying a voltage to a first combination of said electrodes to form a standing wave on said elastic member, said standing wave being formed with at least one node;

applying a voltage to at least a second combination of said electrodes either concurrently or non-concurrently with applying a voltage to said first combination of said electrodes to move said node about said stator sequentially over time; and applying a voltage to said common electrode which is in phase opposition to the voltage applied to said first and second combination of electrodes.

8. The method of claim 7, further comprising the step of electrically coupling a non-voltage input receiving electrode to said common electrode.

9. A method for vibrating a stator, said stator having a vibrator mounted thereon, said vibrator being formed as a disk with a plurality of vibrator elements, a plurality of electrodes affixed to a respective vibrator element, and a driving circuit for exciting at least one of the electrodes in a plurality of combinations to generate different vibration modes on the stator, the method comprising the steps of:

applying no voltage to at least one of the electrodes for a time period; and electrically coupling said at least one electrode to the common electrode during the time period.

* * * * *